(12) United States Patent  (10) Patent No.: US 8,369,571 B2
Ishikawa et al.  (45) Date of Patent: Feb. 5, 2013

(54) IMAGE SIGNAL PROCESSING APPARATUS, IMAGE SIGNAL PROCESSING METHOD, AND PROGRAM

(75) Inventors: Takanori Ishikawa, Saitama (JP); Tomoyuki Otsuki, Kanagawa (JP); Masaki Handa, Kanagawa (JP); Tetsujiro Kondo, Tokyo (JP)

(73) Assignee: Sony Corporation, Tokyo (JP)

( * ) Notice: Subject to any disclaimer, the term of this patent is extended or adjusted under 35 U.S.C. 154(b) by 957 days.

(21) Appl. No.: 12/413,694

(22) Filed: Mar. 30, 2009

(65) Prior Publication Data

US 2009/0252374 A1 Oct. 8, 2009

(30) Foreign Application Priority Data

Apr. 3, 2008 (JP) .................................. 2008-096990

(51) Int. Cl.
*G06K 9/00* (2006.01)
(52) U.S. Cl. ...................................................... 382/103
(58) Field of Classification Search .................. 382/100, 382/103
See application file for complete search history.

(56) References Cited

U.S. PATENT DOCUMENTS

| 6,301,496 | B1 * | 10/2001 | Reisfeld | 600/407 |
| 7,024,040 | B1 * | 4/2006 | Itokawa | 382/199 |
| 7,899,208 | B2 * | 3/2011 | Kondo et al. | 382/103 |
| 2008/0285800 | A1 * | 11/2008 | Miyake et al. | 382/103 |
| 2009/0175496 | A1 * | 7/2009 | Kondo et al. | 382/103 |

FOREIGN PATENT DOCUMENTS

| JP | 2005-301984 | 10/2005 |
| JP | 2005-303983 | 10/2005 |
| JP | 2007-272732 | 10/2007 |
| JP | 2007-272734 | 10/2007 |
| JP | 2009253505 A * | 10/2009 |
| WO | WO 2005/066897 * | 7/2005 |

OTHER PUBLICATIONS

European Search Report issued Aug. 20, 2010 in EP09 15 6785.9-2218 / 2107524.

* cited by examiner

*Primary Examiner* — Bhavesh Mehta
*Assistant Examiner* — Shefali Goradia
(74) *Attorney, Agent, or Firm* — Oblon, Spivak, McClelland, Maier & Neustadt, L.L.P.

(57) ABSTRACT

An image signal processing apparatus includes a detecting unit configured to detect a motion vector of a tracking point provided in an object in a moving image, a computing unit configured to compute a reliability parameter representing the reliability of the detected motion vector, a determining unit configured to determine whether the detected motion vector is adopted by comparing the computed reliability parameter with a boundary, an accumulating unit configured to accumulate the reliability parameter, and a changing unit configured to change the boundary on the basis of the accumulated reliability parameters.

10 Claims, 29 Drawing Sheets

IMAGE SIGNAL PROCESSING APPARATUS, IMAGE SIGNAL PROCESSING METHOD, AND PROGRAM

BACKGROUND OF THE INVENTION

1. Field of the Invention

The present invention relates to an image signal processing apparatus, an image signal processing method, and a program and, in particular, to an image signal processing apparatus, an image signal processing method, and a program capable of accurately tracking an object that is present in an image.

2. Description of the Related Art

A large number of methods for detecting a moving object in an image displayed as a moving image and tracking the detected object have been developed.

However, in existing methods, tracking of an object sometimes fails due to disturbance, such as image noise or long-time occlusion.

To solve such a problem, for example, the following method is proposed: an object moving in an image is detected, the object is tracked, and, if a user determines that a desired tracking result is not obtained, the user manually specifies a new object (refer to, for example, Japanese Unexamined Patent Application Publication No. 2007-272732).

In a process for tracking an object in an image, detection of an accurate motion vector of the object is necessary. In order to determine the accuracy of the detected motion vector, a method for comparing each of an evaluation value indicating the accuracy of the motion vector (a result of computation of a correlation value) and the activity that is a value indicating the roughness of an image and the spatial correlation with a predetermined threshold value (a value predefined on the basis of an ideal moving image) may be used.

SUMMARY OF THE INVENTION

With the development of used for image pickup apparatuses (e.g., video cameras) and display devices (e.g., television sets and personal computers), a variety of moving image formats have also been developed. For example, a variety of types of moving image include a moving image captured by a user using a video camera and edited by the user, a moving image broadcasted as a television program, a moving image communicated via a network, such as the Internet, a moving image having a resolution converted through predetermined image processing (e.g., an up-converted moving image), and a moving image repeatedly subjected to compression-encoding and decoding.

Accordingly, among moving images viewed by a user, an unexpected moving image format that is not included in the above-described formats for object tracking may appear. If an object in an image having an unexpected format is tracked, a proper result of comparison of the evaluation value and the threshold value of the detected motion vector may not be obtained when the accuracy of the detected motion vector is determined.

In such a case, an accurate motion vector is not obtained, and therefore, it is difficult to perform highly precise tracking of an object.

Accordingly, the present invention provides highly precise tracking of an object by obtaining an accurate motion vector.

According to an embodiment of the present invention, an image signal processing apparatus includes detecting means for detecting a motion vector of a tracking point provided in an object in a moving image, computing means for computing a reliability parameter representing the reliability of the detected motion vector, determining means for determining whether the detected motion vector is adopted by comparing the computed reliability parameter with a boundary, accumulating means for accumulating the computed reliability parameter, and changing means for changing the boundary on the basis of the accumulated reliability parameters.

When a transfer process of the tracking point occurs and a difference between a motion vector corresponding to the original tracking point before transfer and a motion vector corresponding to a new tracking point after transfer stays within a predetermined range, the accumulating means can accumulate the reliability parameter representing the reliability of the motion vector corresponding to the original tracking point.

The changing means can change the boundary on the basis of the accumulated reliability parameter in response to a user operation to instruct correction of the position of the tracking point.

In response to the user operation to instruct correction of the position of the tracking point, the accumulating means can exclude, from the accumulated reliability parameters, the reliability parameters accumulated during a predetermined period of time before the user operation was performed, and, after the reliability parameters accumulated during the predetermined period of time before the user operation was performed are excluded, the changing means can change the boundary on the basis of the accumulated reliability parameters.

When a predetermined number of the reliability parameters are accumulated, the changing means can change the boundary on the basis of the accumulated reliability parameter.

The computing means can compute an evaluation value representing a similarity between two images in a predetermined region including the tracking point and a block activity representing variation in pixels in the predetermined region including the tracking point, where a pair of the evaluation value and the block activity serves as the reliability parameter indicating the reliability of the detected motion vector, and the accumulating means can accumulate the pair of the computed evaluation value and block activity as the reliability parameter.

When accumulating reliability parameters having the same block activity, the accumulating means can accumulate only the reliability parameter having the larger evaluation value.

According to another embodiment of the present invention, a method for processing an image signal includes the steps of detecting a motion vector of a tracking point provided in an object in a moving image, computing a reliability parameter representing the reliability of the detected motion vector, determining whether the detected motion vector is adopted by comparing the computed reliability parameter with a boundary, accumulating the computed reliability parameter, and changing the boundary on the basis of the accumulated reliability parameters.

According to still another embodiment of the present invention, a computer-readable program includes program code for causing a computer to execute the steps of detecting a motion vector of a tracking point provided in an object in a moving image, computing a reliability parameter representing the reliability of the detected motion vector, determining whether the detected motion vector is adopted by comparing the computed reliability parameter with a boundary, accumulating the computed reliability parameter, and changing the boundary on the basis of the accumulated reliability parameters.

According to an embodiment of the present invention, a motion vector of a tracking point provided in an object in a moving image is detected, a reliability parameter representing the reliability of the detected motion vector is computed, and whether the detected motion vector is adopted or not is determined by comparing the computed reliability parameter with a boundary. In addition, the computed reliability parameter is accumulated, and the boundary is changed on the basis of the accumulated reliability parameters.

According to the embodiment of the present invention, the accuracy of a motion vector can be accurately determined.

In addition, according to the embodiment of the present invention, the accuracy of a highly precise tracking of an object can be performed.

DESCRIPTION OF THE PREFERRED EMBODIMENTS

Exemplary embodiments of the present invention are described in detail below with reference to the accompanying drawings.

Figure 1:
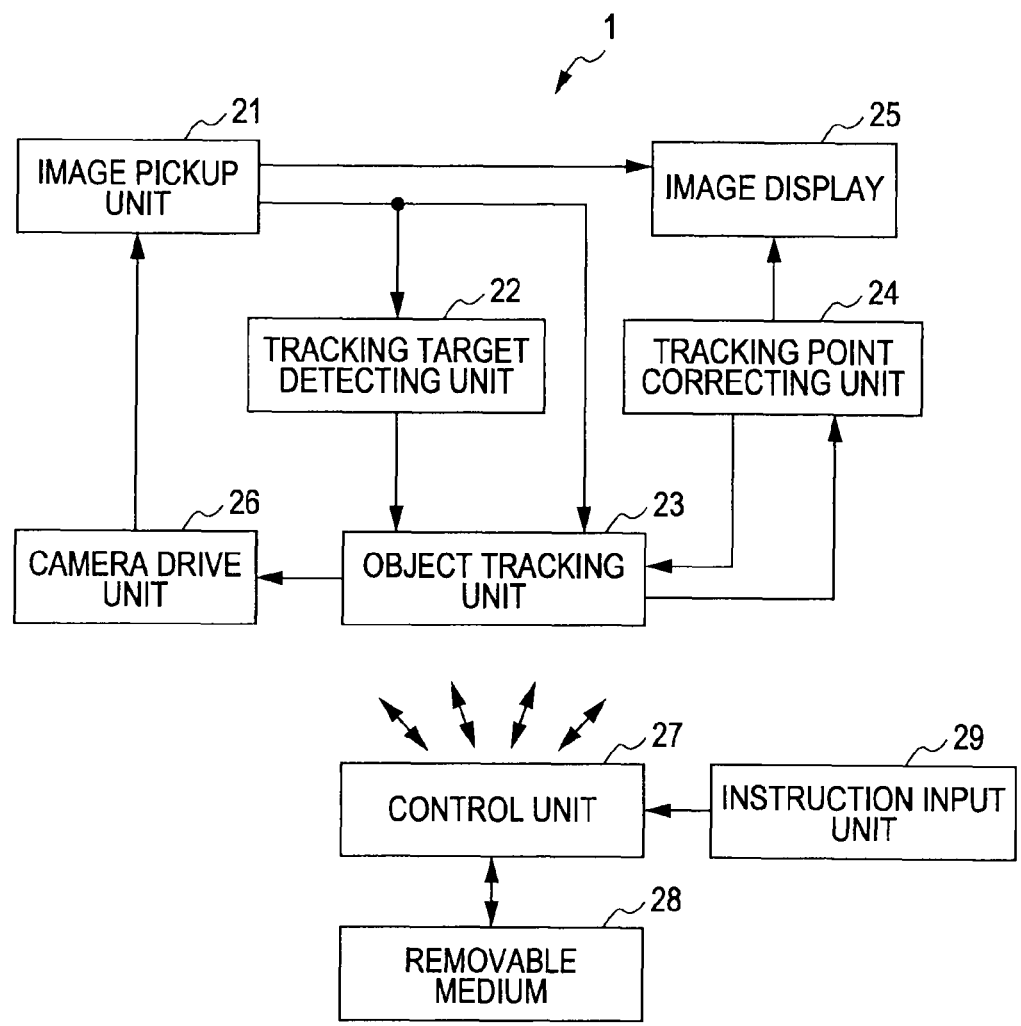
FIG. 1 is a block diagram illustrating an exemplary configuration of a security camera system according to an embodiment of the present invention.

FIG. 1 illustrates an exemplary configuration of a security camera system according to an embodiment of the present invention.

A security camera system 1 includes an image pickup unit 21, such as a video camera, a tracking target detecting unit 22 that detects an object to be tracked in a captured image, an object tracking unit 23 that tracks a tracking point of the detected object, a tracking point correcting unit 24 that changes a tracking point in accordance with a user instruction, an image display 25 that displays, for example, the captured image, a camera drive unit 26 that moves the image pickup unit 21 in order to change an image capturing direction, a control unit 27 that performs overall control of the security camera system 1, a removable medium 28 containing a control program, and an instruction input unit 29 that receives a user instruction.

The image pickup unit 21 is formed from, for example, a video camera including an image pickup element, such as a charge coupled device (CCD) sensor or a complementary metal oxide semiconductor (CMOS) sensor. The image pickup unit 21 supplies an imaging signal obtained through an image capturing operation to the downstream components. The tracking target detecting unit 22 detects an object to be tracked in an image based on the imaging signal (hereinafter simply referred to as an "image") supplied from the image pickup unit 21. Thereafter, the tracking target detecting unit 22 sends the position of a tracking point set on the object to the object tracking unit 23.

The object tracking unit 23 operates so as to track the tracking point sent from the tracking target detecting unit 22 in the image supplied from the image pickup unit 21. In addition, the object tracking unit 23 outputs the result of tracking to the tracking point correcting unit 24.

Furthermore, the object tracking unit 23 controls the camera drive unit 26 so that the camera drive unit 26 can capture the image of the moving object in accordance with the result of tracking. When instructed to correct the position of the tracking point through the instruction input unit 29 by the user, the tracking point correcting unit 24 reflects a correction value received from the user into the result of tracking received from the object tracking unit 23. The tracking point correcting unit 24 then displays the correction result on the image display 25. In this way, the object tracking unit 23 can operate so as to track the corrected tracking point from the next frame. Under the control of the object tracking unit 23, the camera drive unit 26 drives the image pickup unit 21 so that the image pickup unit 21 can capture an image containing the tracking point of the object.

The control unit 27 is formed from, for example, a microcomputer. The control unit 27 controls the components of the security camera system 1 by executing the control program stored in the removable medium 28. The instruction input unit 29 includes a variety of buttons and switches, or a remote controller using infrared light or radio waves. The instruction input unit 29 sends a signal corresponding to a user instruction to the control unit 27.

Figure 2:
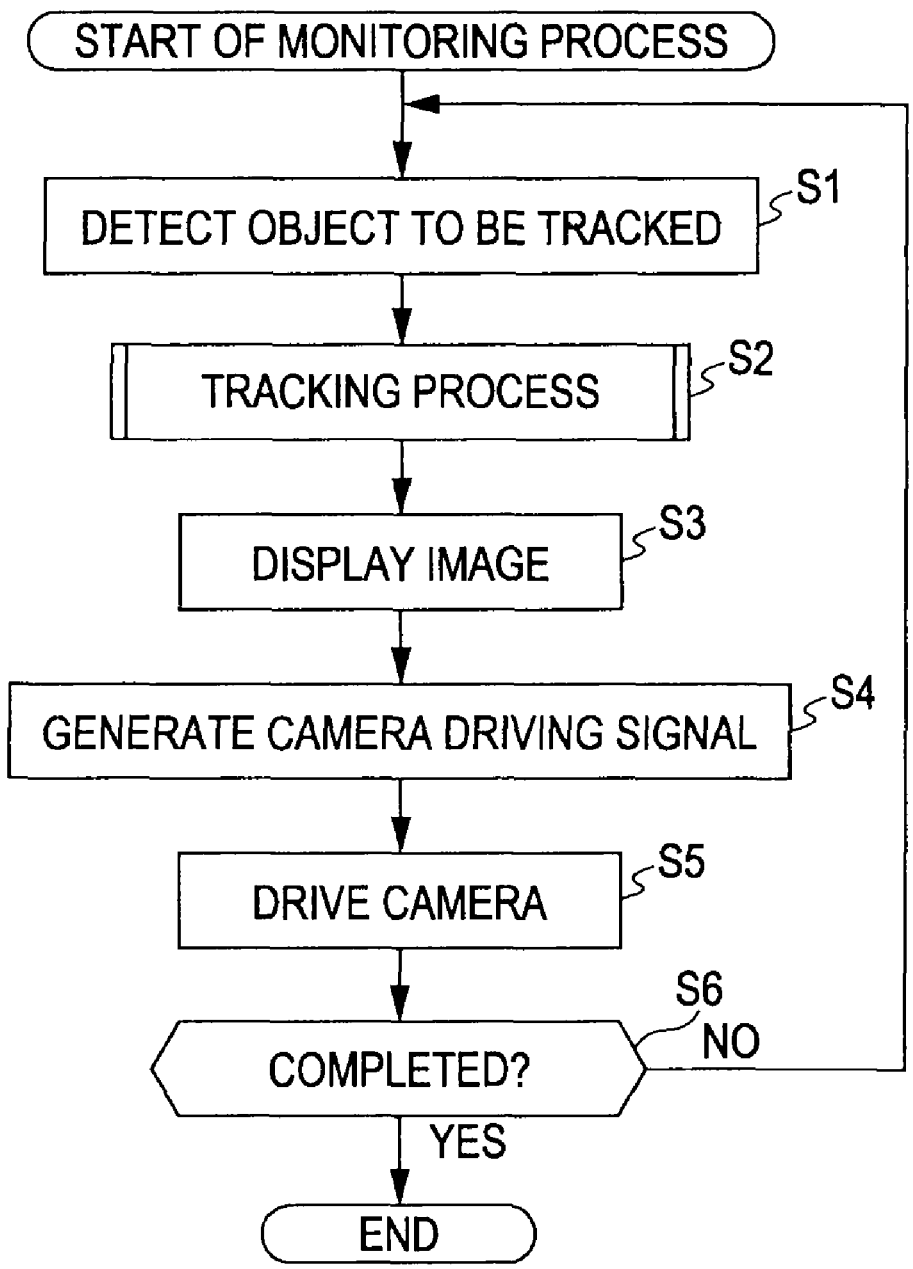
FIG. 2 is a flowchart illustrating a monitoring process.

A monitoring operation performed by the security camera system shown in FIG. 1 is described next with reference to the flowchart shown in FIG. 2. The monitoring operation starts when the image pickup unit 21 captures an image of an area to be monitored, and an imaging signal of the captured area is supplied to the downstream components.

In step S1, the tracking target detecting unit 22 detects an object to be tracked in the image supplied from the image pickup unit 21. More specifically, when, for example, a moving object is present in the image, the tracking target detecting unit 22 detects the moving object as an object to be tracked and sets a tracking point in the detected object to be tracked (e.g., a point having the highest luminance or the center point of the object). The tracking target detecting unit 22 then outputs the position of the tracking point to the object tracking unit 23 as a detection result. Note that the user can specify a certain point through the instruction input unit 29 so as to determine the object to be tracked and the tracking point.

In step S2, the object tracking unit 23 performs a tracking process (described in more detail below with reference to FIG. 5). In the tracking process, the object tracking unit 23 tracks the tracking point detected in step S1. Thus, the object tracking unit 23 tracks the tracking point set in the object to be tracked (e.g., a human being, an animal, or a motor vehicle) in the image captured by the image pickup unit 21 and outputs the tracking result to the control unit 27. In addition, the object tracking unit 23 outputs the position information indicating the position of the tracking point to the tracking point correcting unit 24.

In step S3, the control unit 27 instructs the image display 25 to display a mark indicating the tracking point in the image captured by the image pickup unit 21 on the basis of the tracking result obtained in step S2.

In step S4, the object tracking unit 23 detects the movement of the object on the basis of the tracking result obtained in step S2, generates a camera driving signal used for driving the camera so that the image of the moved object can be captured, and outputs the camera driving signal to the camera drive unit 26. In step S5, the camera drive unit 26 drives the image pickup unit 21 in accordance with the camera driving signal received from the object tracking unit 23. Thus, the image pickup unit 21 pans or tilts the camera so that the tracking point does not move to outside the screen.

In step S6, for example, the control unit 27 determines whether the monitoring process in execution is completed on the basis of the presence of a completion instruction received from the user through the instruction input unit 29. If the completion instruction from the user is not detected and, therefore, if it is determined that the monitoring process is not completed, the processing returns to step S1. Thereafter, the subsequent processes are performed. If, in step S6, the completion instruction from the user is detected and, therefore, it is determined that the monitoring process is to be completed, the control unit 27 completes the monitoring process. In this way, the overall monitoring process is performed.

Figure 3:
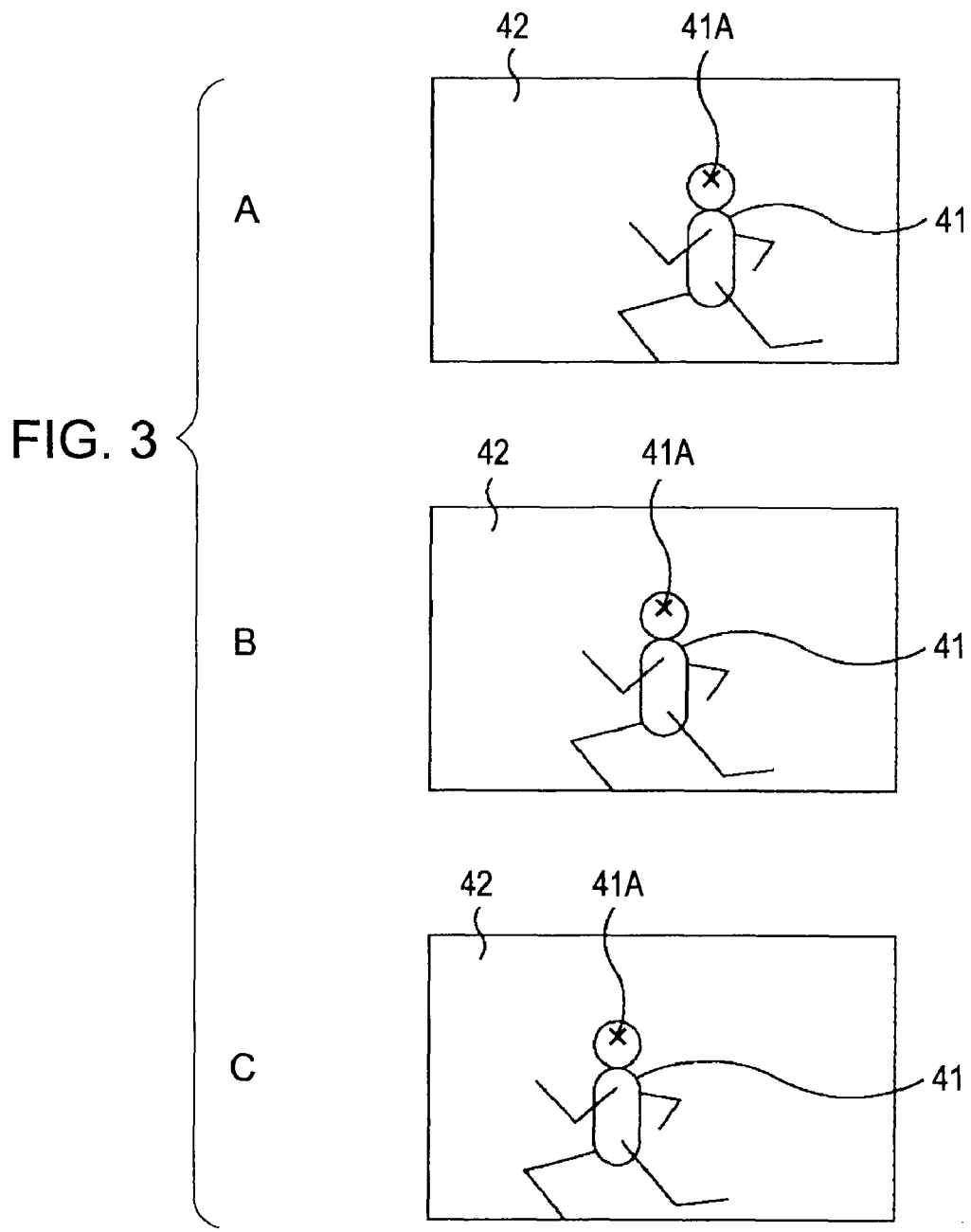
FIGS. 3A to 3C illustrate an example of time-series images displayed by the security camera system shown in FIG. 1.

FIGS. 3A to 3C illustrate an example of time-series images displayed on the image display 25 when the monitoring process is in execution.

That is, FIGS. 3A to 3C illustrate an example in which a running human is detected as an object 41, and a tracking point 41A set on the object 41 is tracked.

An exemplary configuration of the object tracking unit 23 shown in FIG. 1 is described in detail next with reference to FIG. 4.

The object tracking unit 23 includes a template matching unit 51, a motion estimating unit 52, a scene change detecting unit 53, a background motion estimating unit 54, a region estimation-related processing unit 55, a transfer candidate preserving unit 56, a tracking point determining unit 57, a template preserving unit 58, a reference line changing unit 59, and a control sub-unit 60.

The template matching unit 51 performs a matching process between an image input from the image pickup unit 21 disposed upstream thereof (hereinafter, the image is referred to as an input image) and a template image preserved in the template preserving unit 58.

The motion estimating unit 52 estimates the motion of the input image and determines whether a motion vector obtained through the estimation can be adopted by comparing a pair of an evaluation value and the block activity indicating the estimation result with a reference line 133 (described below with reference to FIG. 20). Thereafter, the motion estimating unit 52 outputs the motion vector and information indicating whether the motion vector can be adopted or not (hereinafter referred to as "adoption judgment information") to the scene change detecting unit 53, the background motion estimating unit 54, the region estimation-related processing unit 55, and the tracking point determining unit 57. In addition, the motion estimating unit 52 supplies, to the reference line changing unit 59, the motion vector obtained through the estimation of the movement of the input image and the evaluation value and block activity used for determining whether the motion vector can be adopted.

The scene change detecting unit 53 detects a scene change on the basis of the motion vector supplied from the motion estimating unit 52 and the adoption judgment information on the motion vector. Thereafter, the scene change detecting unit 53 sets or resets a scene change flag indicating the detection result. The background motion estimating unit 54 estimates the background motion on the basis of the motion vector supplied from the motion estimating unit 52 and the adoption judgment information on the motion vector. Subsequently, the background motion estimating unit 54 supplies the estimation result to the region estimation-related processing unit 55.

The region estimation-related processing unit 55 performs a region estimation process on the basis of the motion vector and the adoption judgment information on the motion vector supplied from the motion estimating unit 52, the background motion supplied from the background motion estimating unit 54, and the tracking point information supplied from the tracking point determining unit 57. In addition, the region estimation-related processing unit 55 generates transfer candidates on the basis of all of the input information. The region estimation-related processing unit 55 supplies the transfer candidates to the transfer candidate preserving unit 56, which preserves the transfer candidates. Furthermore, the region estimation-related processing unit 55 generates a template on the basis of the input image and supplies the generated template to the template preserving unit 58, which preserves the template.

The tracking point determining unit 57 determines a tracking point on the basis of the motion vector and the adoption judgment information on the motion vector supplied from the motion estimating unit 52 and the transfer candidates supplied from the transfer candidate preserving unit 56. Thereafter, the tracking point determining unit 57 outputs tracking point information indicating the position of the determined tracking point to the motion estimating unit 52 and the region estimation-related processing unit 55. Furthermore, if transfer of the tracking point occurs, the tracking point determining unit 57 sends that information to the reference line changing unit 59.

The reference line changing unit 59 changes the reference line used for adoption judgment of the motion vector obtained through estimation performed by the motion estimating unit 52 on the basis of the motion vector supplied from the motion estimating unit 52, the estimation value and block activity used for the adoption judgment of the motion vector, information about the occurrence of transfer of the tracking point supplied from the tracking point determining unit 57, and information about the presence of a user instruction for tracking point correction supplied from the control unit 27. The reference line changing unit 59 then sends the changed reference line to the motion estimating unit 52.

The control sub-unit 60 controls the template matching unit 51 and the template preserving unit 58 so that the detected object is tracked on the basis of the tracking point information output from the tracking target detecting unit 22. In addition, the control sub-unit 60 outputs a control signal to the camera drive unit 26 so that a tracking point is displayed in a screen of the image display 25. In this way, the control sub-unit 60 controls the drive of image pickup unit 21. Thus, the tracking point is controlled so as not to move to outside the screen. In addition, the control sub-unit 60 outputs the tracking result, such as the position of the tracking point in the screen, to the tracking point correcting unit 24 and the control unit 27.

A tracking process performed by the object tracking unit 23 (a process corresponding to the process performed in step S2 shown in FIG. 2) is described next with reference to the flowchart shown in FIG. 5.

In the tracking process, normal processing and exception processing are alternately performed. That is, in step S11, normal processing is performed (described in more detail below with reference to FIG. 9), and the tracking point detected by the tracking target detecting unit 22 is tracked. If the tracking of the tracking point is lost, the exception processing (described in more detail below with reference to FIG. 12) is performed in step S12.

In the exception processing, if the tracking point disappears from the image, a returning process to the normal processing is performed using template matching. In addition, in the exception processing, if it is determined that the tracking process is unable to continue, that is, if it is determined that the processing is unable to return to the normal processing, the processing is completed. However, if it is determined that return to the normal processing is possible after the returning process is performed using template matching, the processing returns to step S11 again. In this way, the normal processing performed in step S1 and the exception processing performed in step S12 are repeatedly executed on a frame-by-frame basis.

As described above, since the normal processing and the exception processing are alternately performed in the tracking process, the tracking point can be tracked even when the tracking point temporarily disappears (e.g., when the object is rotated, occlusion occurs, or a scene change occurs), as shown in the example of the images shown in FIGS. 6A to 6C, 7A to 7C, and 8A to 8C.

In the example shown in FIG. 6A, a human face 74 serving as an object to be tracked is displayed in a frame n−1. The human face 74 includes a right eye 72 and a left eye 73. In addition, the right eye 72 (precisely speaking, one pixel in the image of the right eye 72) is set to a tracking point 71.

As shown in FIG. 6B, in the next frame n, the human serving as an object to be tracked moves to the left. As shown in FIG. 6C, in the next frame n+1, the human face 74 rotates in the clockwise direction. As a result, the right eye 72 serving as the tracking point disappears, and therefore, the tracking is lost. Accordingly, in the above-described normal processing in step S11 shown in FIG. 5, the left eye 73, which is present in the same object in which the right eye 72 is present (i.e., the human face 74), is selected as a new tracking point. Thus, the tracking point is transferred to the left eye 73. In this way, the tracking can be performed.

Figure 7:
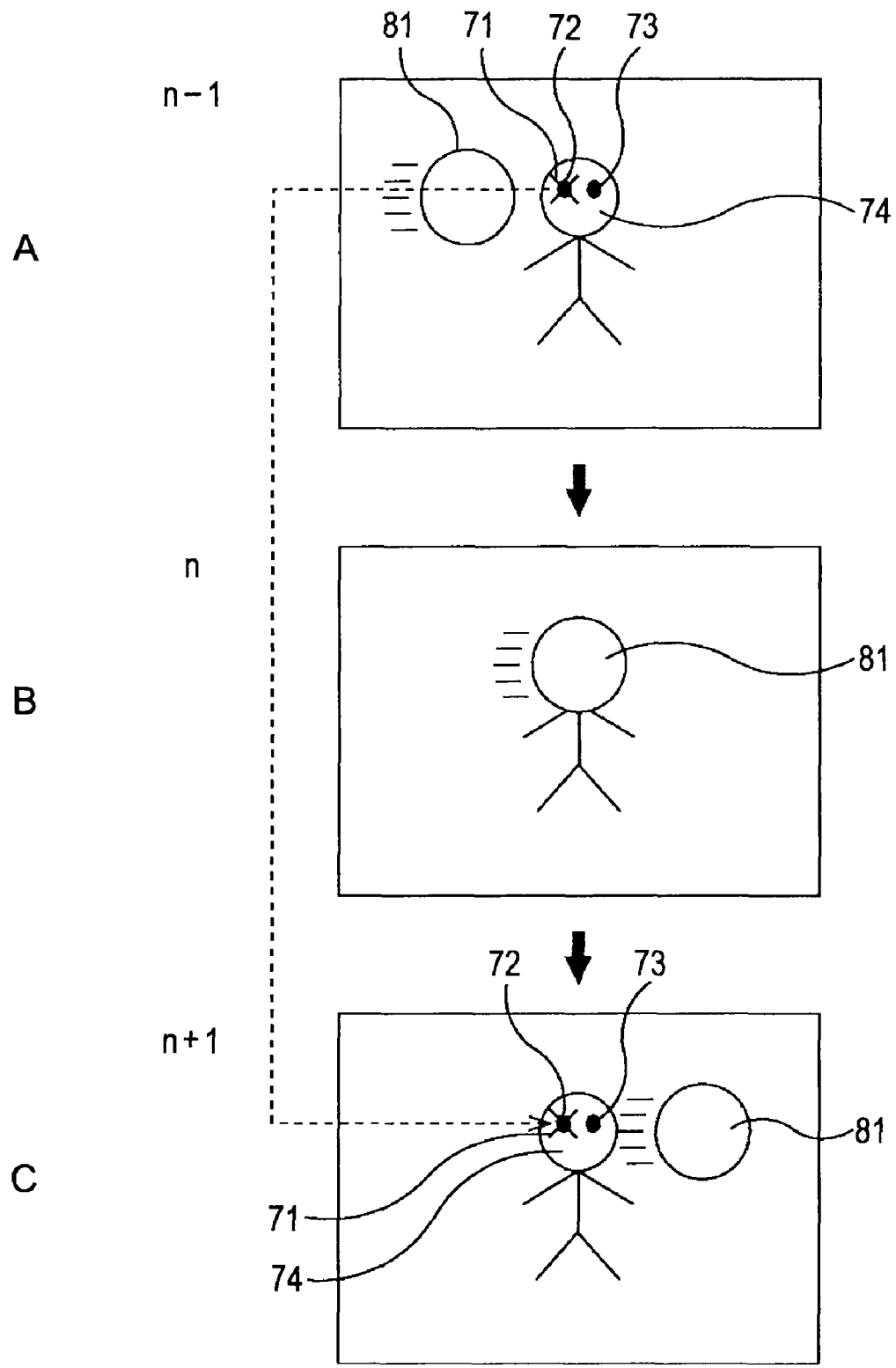
FIGS. 7A to 7C are diagrams illustrating the tracking process when occlusion occurs.

In a frame n−1 shown in the example of FIG. 7A, a ball 81 is moving from the left of the human face 74 which is an object to be tracked. In the next frame n shown in FIG. 7B, the ball 81 just covers the human face 74. At that time, the human face 74 including the right eye 72, which is specified as the tracking point 71, is not displayed. If such occlusion occurs, a transfer point that is to be replaced with the tracking point 71 also disappears. Therefore, after that point of time, it is difficult to track the tracking point.

In such a case, template matching is performed. That is, an image of a frame n−1 (actually a frame temporally preceding a frame n−1) including the right eye 72 serving as the tracking point 71 is prestored as a template. When the ball 81 further moves to the right and the right eye 72 serving as the tracking point 71 appears in the frame n+1 again, as shown in FIG. 7C, it is detected through the exception processing in step S12 shown in FIG. 5 that the right eye 72 serving as the tracking point 71 appears on the basis of the template again. Thereafter, the right eye 72 is tracked as the tracking point 71 again.

Figure 8:
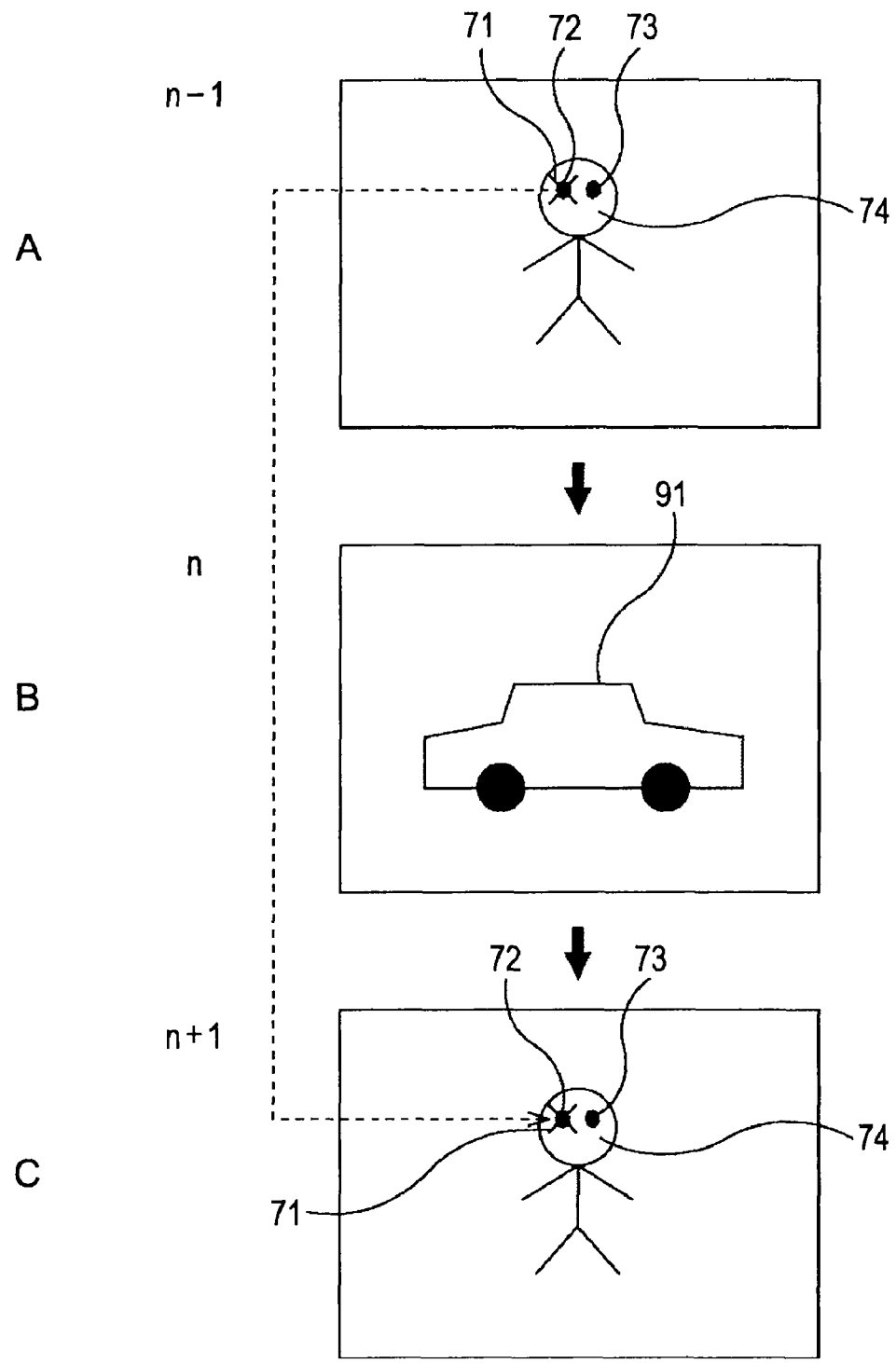
FIGS. 8A to 8C are diagrams illustrating the tracking process when a scene change occurs.

In the example shown in FIG. 8A, the human face 74 serving as an object to be tracked is displayed in a frame n−1. However, as shown in FIG. 8B, in a frame n, the human face 74 disappears, and a motor vehicle 91 is displayed full screen. In such a case, a scene change occurs. Even when such a scene change occurs and the tracking point 71 disappears from the image, it can be detected through the exception processing in step S12 shown in FIG. 5 that the right eye 72 serving as the tracking point 71 appears again on the basis of the template if the right eye 72 serving as the tracking point 71 is displayed in a frame n+1, as shown in FIG. 8C. Thus, the right eye 72 can be tracked again as the tracking point 71.

Figure 5:
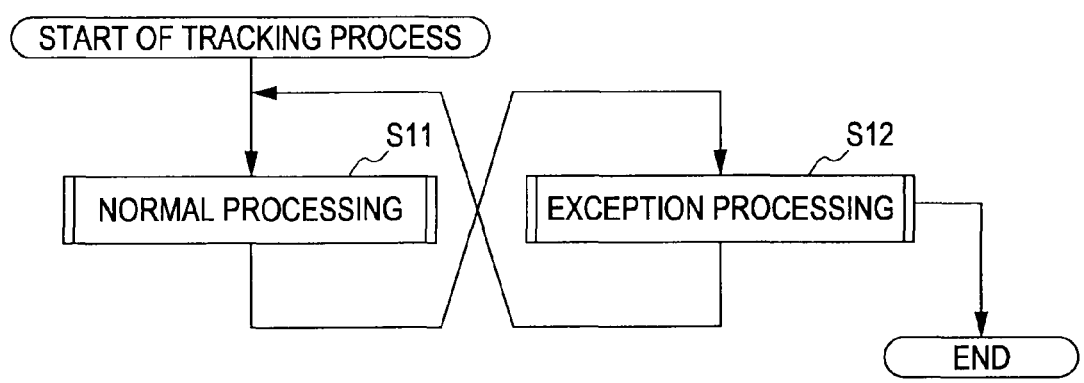
FIG. 5 is a flowchart illustrating a tracking process.
Figure 6:
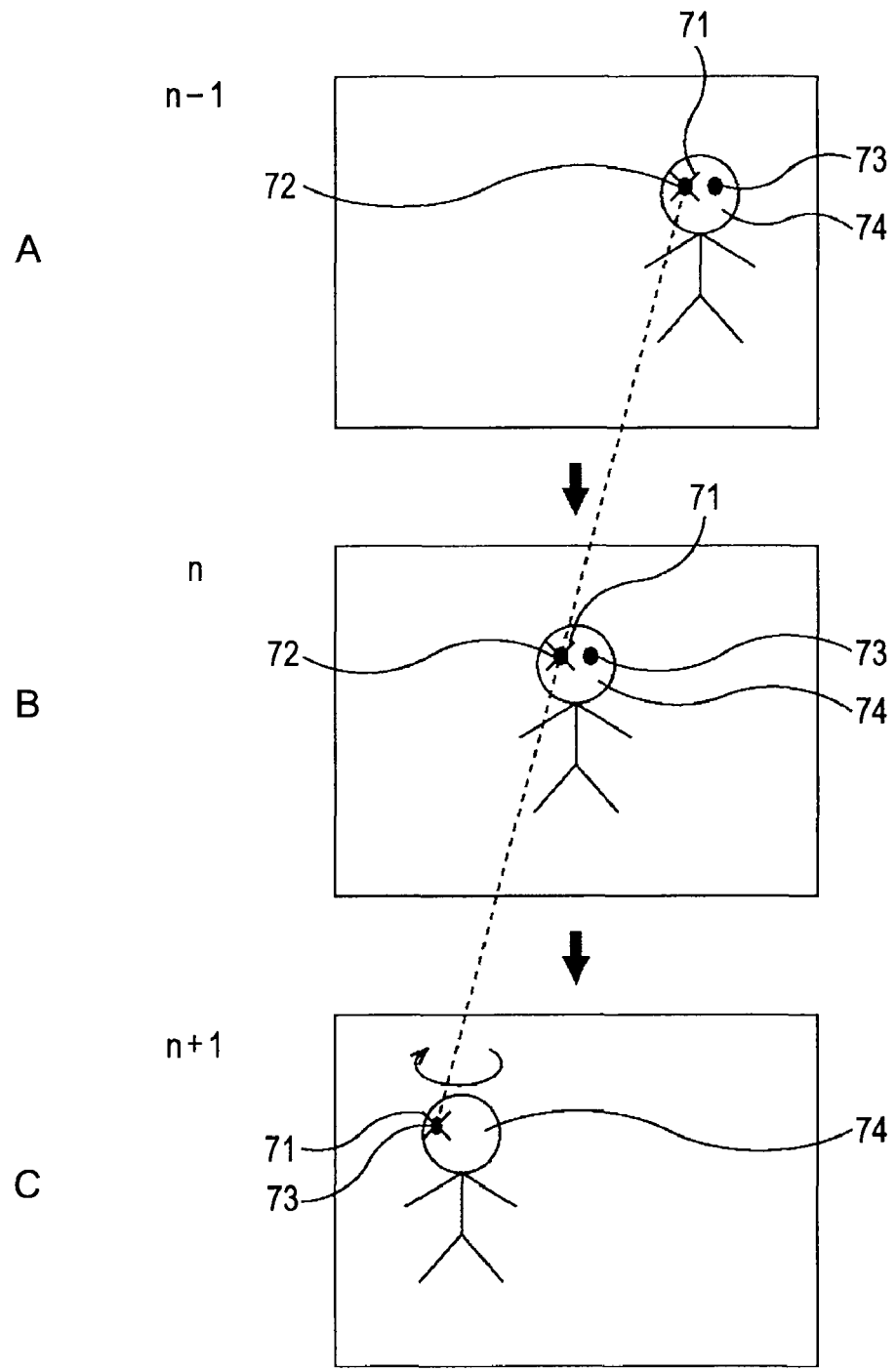
FIGS. 6A to 6C are diagrams illustrating the tracking process when an object to be tracked is rotated.

The normal processing performed in step S11 shown in FIG. 5 is described in detail next with reference to the flowchart shown in FIG. 9.

In step S21, the tracking point determining unit 57 performs an initialization process (described in more detail below with reference to FIG. 10) of the normal processing. Through the initialization process, a region estimating range having the tracking point as a reference is determined. As used herein, the term "region estimating range" refers to a range referenced when a range of pixels belonging to an object including a tracking point (e.g., a human face or the human body that is a rigid body moving together with a human eye when the tracking point is the human eye) is estimated. A transfer point is selected from among the pixels in the region estimating range.

In step S22, the control sub-unit 60 controls the units so that the units wait for input of an image of the next frame. In step S23, the motion estimating unit 52 estimates the motion of the tracking point. That is, the motion estimating unit 52 can acquire images of two continuous frames by receiving, in step S22, a temporally subsequent frame of a frame including a tracking point (e.g., a tracking point specified by a user). Hereinafter, the frame including the tracking point is referred to as a "previous frame", and the temporally subsequent frame is referred to as a "subsequent frame". Accordingly, in step S23, the motion estimating unit 52 can estimate the motion of the tracking point by determining the position of the tracking point in the subsequent frame corresponding to the tracking point in the previous frame.

Note that the terms "temporally previous" and "temporally subsequent" refer to the order in which input or processing is performed. In general, the order in which images are captured is the same as the order in which the images in frames are input. In such a case, a frame temporally previously captured frame is referred to as a "previous image". However, when a frame temporally subsequently captured is processed first, the frame temporally subsequently captured is referred to as a "previous image".

In step S24, the motion estimating unit 52 determines whether, as a result of processing performed in step S23, the tracking point was able to be estimated. For example, whether the tracking point was able to be estimated can be determined by determining whether the motion vector generated and output by the motion estimating unit 52 can be adopted. More specifically, if the motion vector can be adopted, it is determined that the tracking point can be estimated. However, if the motion vector is not adopted, it is determined that the tracking point is not estimated. The adoption judgment of the motion vector is described in more detail below with reference to FIG. 21.

Note that, in step S24, it may be determined that the tracking point can be estimated if the estimation result of the motion of the tracking point and the estimation result of the motion of a point in the vicinity of the tracking point are the same as the motion of the majority of the points. Otherwise, it may be determined that the tracking point is unable to be estimated.

If, in step S24, it is determined that the motion of the tracking point can be estimated, that is, if it is determined that it is relatively highly likely that the tracking point is set on a corresponding point of the same object, the processing proceeds to step S25. More specifically, in the example shown in FIG. 6, if the right eye 72 is specified as the tracking point 71 in the previous frame and it is relatively highly likely that the right eye 72 is properly tracked in the subsequent frame, it is determined that the motion of the tracking point can be estimated.

In step S25, the tracking point determining unit 57 shifts the tracking point by the amount of the motion (i.e., the motion vector) estimated in step S23. Thus, a tracked position of the tracking point present in the previous frame can be determined in the subsequent frame.

After processing in step S25 is completed, the processing proceeds to step S26, where a region estimation related process is performed. In the region estimation related process, a technique proposed by the present inventor in Japanese Unexamined Patent Application Publication No. 2005-303983 can be employed.

By performing the region estimation related process in step S26, the region estimating range determined in the initialization process of the normal processing performed in step S21 is updated. In addition, a candidate of a transfer point (a transfer candidate) is extracted in advance before the tracking becomes difficult and is stored in the transfer candidate preserving unit 56. Note that the transfer point is used if the tracking point is not displayed due to, for example, rotation of the object to be tracked. Furthermore, if the transfer to even the transfer candidate becomes difficult, the tracking is temporarily stopped. However, a template used for determining whether the tracking can be resumed when the tracking point appears again is generated and is stored in the template preserving unit 58.

After the region estimation related process performed in step S26 is completed, the processing returns to step S22, and the subsequent processes are repeated.

As described above, as long as the motion of the tracking point can be estimated, the processing from steps S22 to S26 is repeatedly performed on a frame-by-frame basis. In this way, the object (the tracking point of the object) is tracked.

In contrast, if, in step S24, it is determined that estimation of the motion of the tracking point is difficult, that is, if, for example, the motion vector is not adopted, as described above, the processing proceeds to step S27.

In step S27, since the transfer candidates generated in the region estimation related process performed in step S26 are preserved in the transfer candidate preserving unit 56, the tracking point determining unit 57 selects one of the transfer candidates having the shortest distance from the original tracking point. Subsequently, in step S28, the tracking point determining unit 57 determines whether, in step S27, it was able to select one of the transfer candidates. If the tracking point determining unit 57 was able to select one of the transfer candidates, the processing proceeds to step S29. In step S29, the tracking point determining unit 57 transfers (changes) the tracking point to the one of the transfer candidates selected in step S27. In this way, the transfer candidate is set to a new tracking point. In addition, the tracking point determining unit 57 sends, to the reference line changing unit 59, information indicating that transfer occurred.

After the processing performed in step S29 is completed, the processing returns to step S23, where the motion of the new tracking point selected from the transfer candidates is estimated. In step S24, it is determined again whether the motion of the new tracking point can be estimated. If the motion of the new tracking point can be estimated, the tracking point is shifted by an estimated amount of motion in step S25. In step S26, the region estimation related process is performed. Thereafter, the processing returns to step S22 again, and the subsequent steps are repeated.

Subsequently, if, in step S24, it is determined that estimation of the motion of even the new tracking point is difficult, the processing proceeds to step S27 again, where a transfer candidate having the second shortest distance from the original tracking point is selected. In step S29, the selected transfer candidate is set to a new tracking point. Thereafter, the processing subsequent to step S23 is repeated for the new tracking point.

Note that, in step S27, estimation of the motion of the tracking point may be difficult even after each of all the transfer candidates preserved in the transfer candidate preserving unit 56 has been transferred to a new tracking point. In such a case, it is determined in step S28 that a transfer candidate was not able to be selected, and therefore, the normal processing is completed. Thereafter, the processing proceeds to step S12 shown in FIG. 5, where exception processing is performed.

Figure 9:
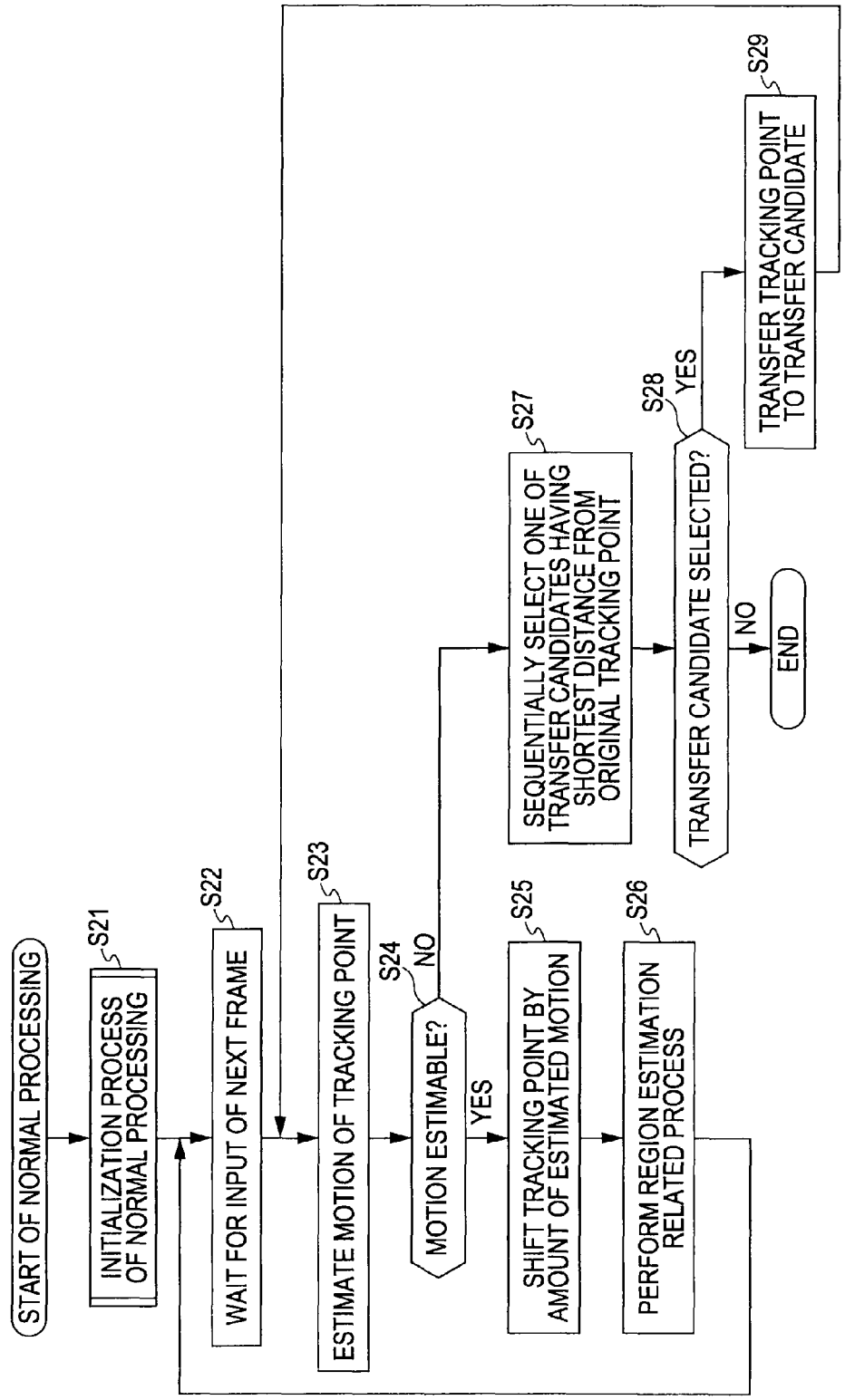
FIG. 9 is a flowchart illustrating normal processing.
Figure 10:
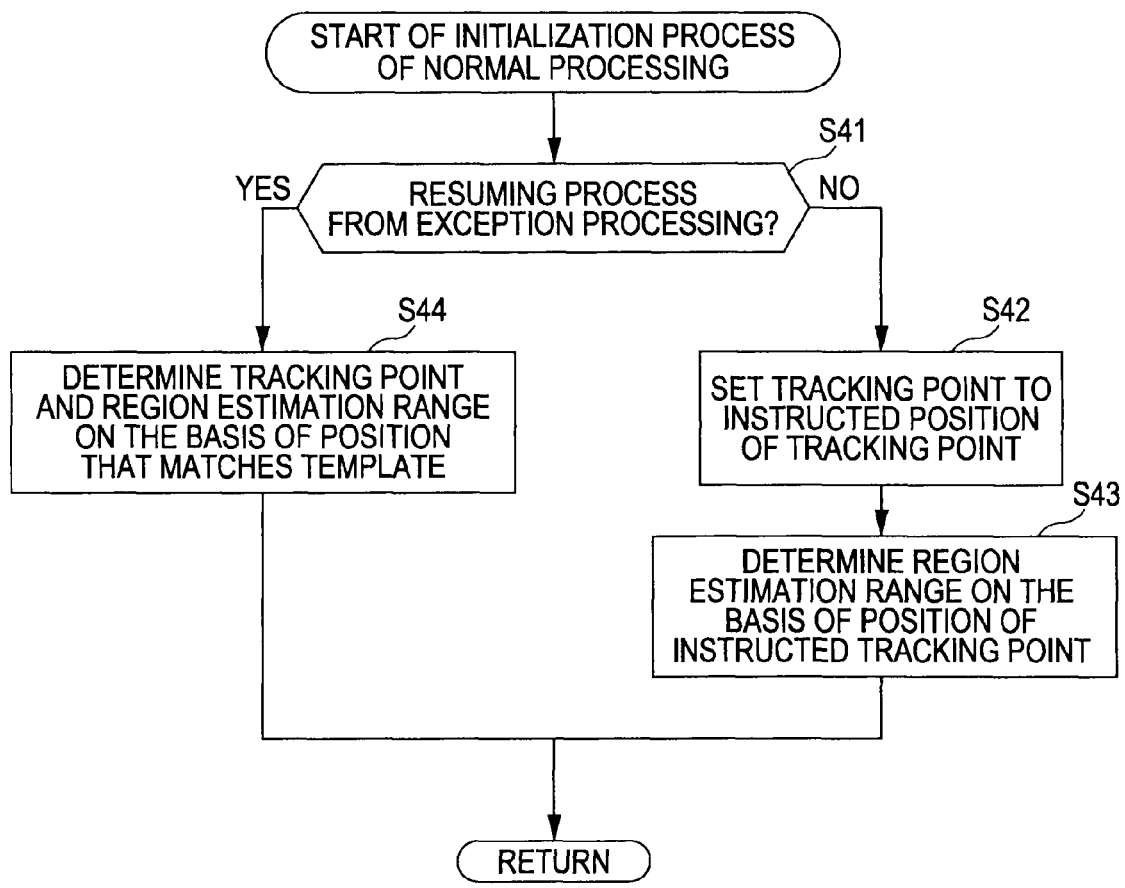
FIG. 10 is a flowchart illustrating an initialization process of the normal processing.

The initialization process of the normal processing performed in step S21 shown in FIG. 9 is described in detail next with reference to the flowchart shown in FIG. 10.

In step S41, the control sub-unit 60 determines whether the normal processing currently executed is a resuming process from exception processing. That is, the control sub-unit 60 determines whether the processing was returned to the normal processing in step S11 again after the exception processing in step S12 shown in FIG. 5 was completed. When a first frame is processed, the exception processing in step S12 has not yet been executed. Accordingly, it is determined that the processing is not a resuming process from exception processing, and the processing proceeds to step S42.

In step S42, the tracking point determining unit 57 sets the tracking point to the instructed position of the tracking point.

As used herein, the term "tracking point instructed position" refers to a point having the highest luminance among the points of an input image or a point specified by a user. For example, a point specified by a user is any point in the input image specified by operating the instruction input unit 29. The tracking point determining unit 57 supplies information regarding the set tracking point to the region estimation-related processing unit 55.

In step S43, the region estimation-related processing unit 55 determines the region estimation range on the basis of the position information about the tracking point set in step S42. The region estimation range is referenced when a point in the object to which the tracking point belongs is estimated. The region estimation range is set in advance so that the object to which the tracking point belongs occupies most of the points of the region estimation range. More specifically, the region estimation range is set in advance so that the position and size of the region estimation range follows the object to which the tracking point belongs. In this way, it can be estimated that a motion area that occupies the largest portion of the region estimation range is the object to which the tracking point belongs. In step S43, for example, a predetermined range at the center of which is the tracking point is set to an initial region estimation range. Thereafter, the processing proceeds to step S22 shown in FIG. 9.

However, if, in step S41, it is determined that the normal processing currently executed is a resuming process from the exception processing in step S12 shown in FIG. 5, the processing proceeds to step S44. In step S44, the tracking point determining unit 57 determines a tracking point and a region estimation range on the basis of a position that matches a template in the exception processing, which is described below with reference to the flowchart shown in FIG. 12. For example, a point in the current frame that matches the tracking point in the template is set to the tracking point. In addition, a predetermined range at the center of which is the set tracking point is set to a region estimation range. Thereafter, the processing proceeds to step S22 shown in FIG. 9. In this way, the initialization process of the normal processing is performed.

A particular example of the initialization process of the normal processing is described below with reference to FIGS. 11A to 11C.

Figure 11:
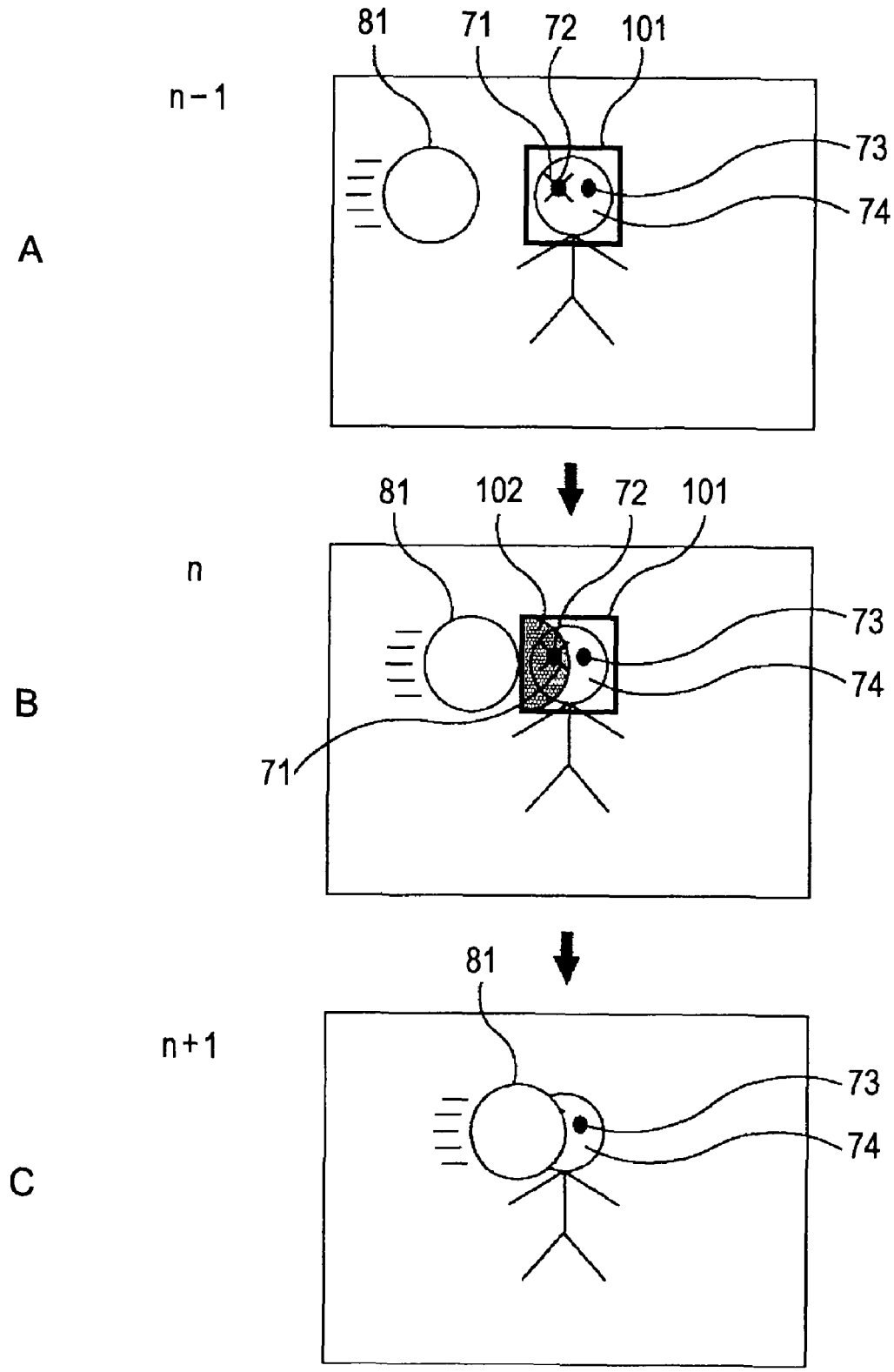
FIGS. 11A to 11C are diagrams illustrating the initialization process of the normal processing.

As shown in FIG. 11A, in step S42, the right eye 72 of a human in a frame n−1 is specified as the tracking point 71. In step S43, a predetermined area including the tracking point 71 is specified as a region estimation range 101. In step S24, it is determined whether a sample point included in the region estimation range 101 can be estimated in the next frame n, as shown in FIG. 11B. In the example shown in FIGS. 11A to 11C, in a frame n+1 shown in FIG. 11C, the left half area 102 of the region estimation range 101 including the right eye 72 is hidden by the ball 81. Accordingly, it is difficult to estimate, in the next frame n+1, the motion of the tracking point 71 displayed in the frame n. Therefore, in such a case, from among the points of the region estimation range 101 (the human face 74 serving as an object including the right eye 72) that are predefined as the transfer candidates in the temporally previous frame n−1, one point (e.g., the left eye 73 included in the human face 74 (more precisely, one pixel in the image of the left eye 73)) is selected. The selected point is set to a new tracking point in the frame n+1.

The exception processing performed subsequent to the above-described normal processing (the exception processing performed in step S12 shown in FIG. 5) is described next with reference to the flowchart shown in FIG. 12.

As noted above, the exception processing is performed when it is determined in step S24 (FIG. 9) for the normal processing that estimation of the motion of the tracking point is difficult and it is further determined in step S28 that the transfer candidate of the tracking point is unable to be selected.

Figure 13:
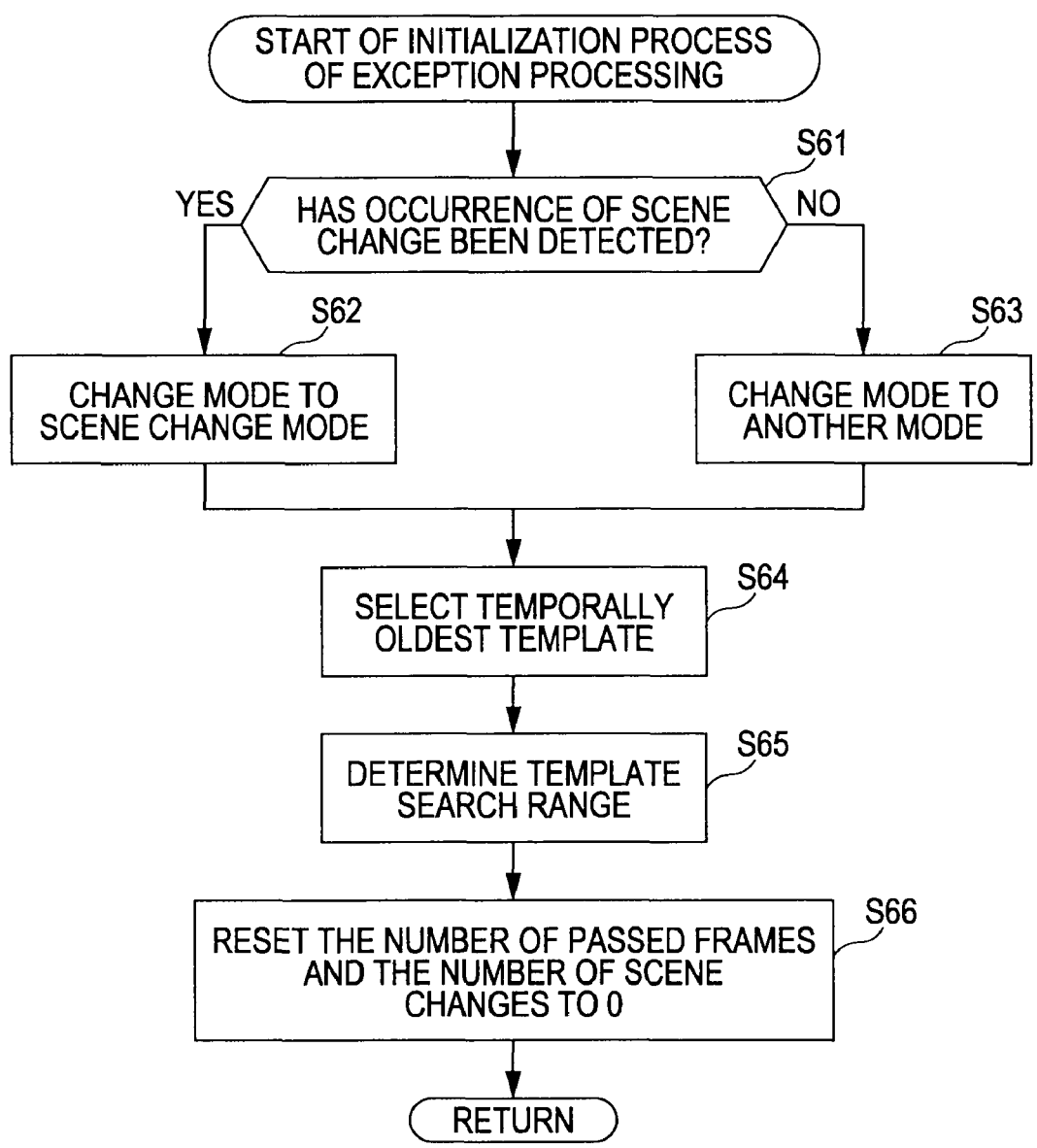
FIG. 13 is a flowchart illustrating an initialization process of the exception processing.

In step S51, the control sub-unit 60 performs an initialization process of the exception processing. The initialization process is described is described in detail with reference to the flowchart shown in FIG. 13.

In step S61, when the exception processing is started, that is, when estimation of the motion of the tracking point is difficult and if the transfer candidate of the tracking point is unable to be selected, the control sub-unit 60 determines whether the occurrence of a scene change was detected by the scene change detecting unit 53. Note that the scene change detecting unit 53 monitors whether a scene change occurs on the basis of the estimation result received from the motion estimating unit 52 at all times.

If it is determined that a scene change has occurred, it can be considered that the inability of tracking results from the scene change. Accordingly, in step S62, the control sub-unit 60 changes the mode to a scene change mode. However, if it is determined that a scene change has not occurred, the control sub-unit 60, in step S63, changes the mode to another mode.

Figure 14:
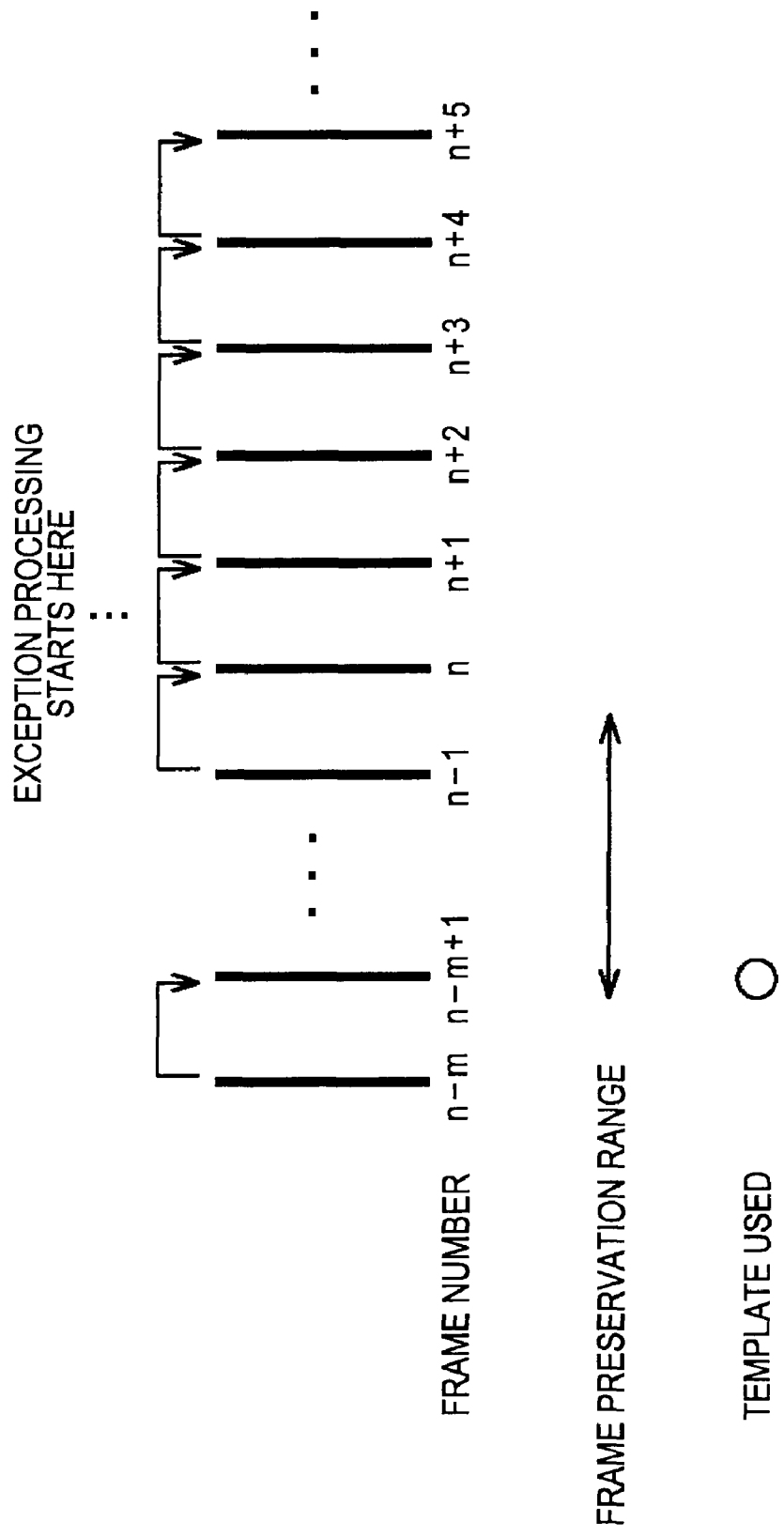
FIG. 14 is a diagram illustrating selection of a template.

After the processing is performed in step S62 or S63, the template matching unit 51, in step S64, selects the temporally oldest template from among the templates preserved in the template preserving unit 58. More specifically, for example, assume that, as shown in FIG. 14, the exception processing is started when a frame n is changed to a frame n+1. Then, from among templates for m frames that are generated from a frame n−m+1 to the frame n and that are stored in the template preserving unit 58, the temporally oldest template generated for the frame n−m+1 is selected.

The reason why, in place of the template immediately before the transition to the exception processing (the template generated for the frame n in the example shown in FIG. 14), the template at some time ahead of the transition is used is that when transition to the exception processing occurs due to, for example, occlusion of the object to be tracked, most of the object is already hidden immediately before the transition occurs, and therefore, it is highly likely that the template at that time is unable to capture a sufficiently large image of the object. Accordingly, by selecting a template at a time slightly ahead of the transition, reliable tracking can be provided.

Referring back to FIG. 13, in step S65, the template matching unit 51 executes a process for determining a template search range. For example, the template search range is determined so that the position of the tracking point immediately before the transition to the exception processing becomes a center of the template search range.

Figure 15:
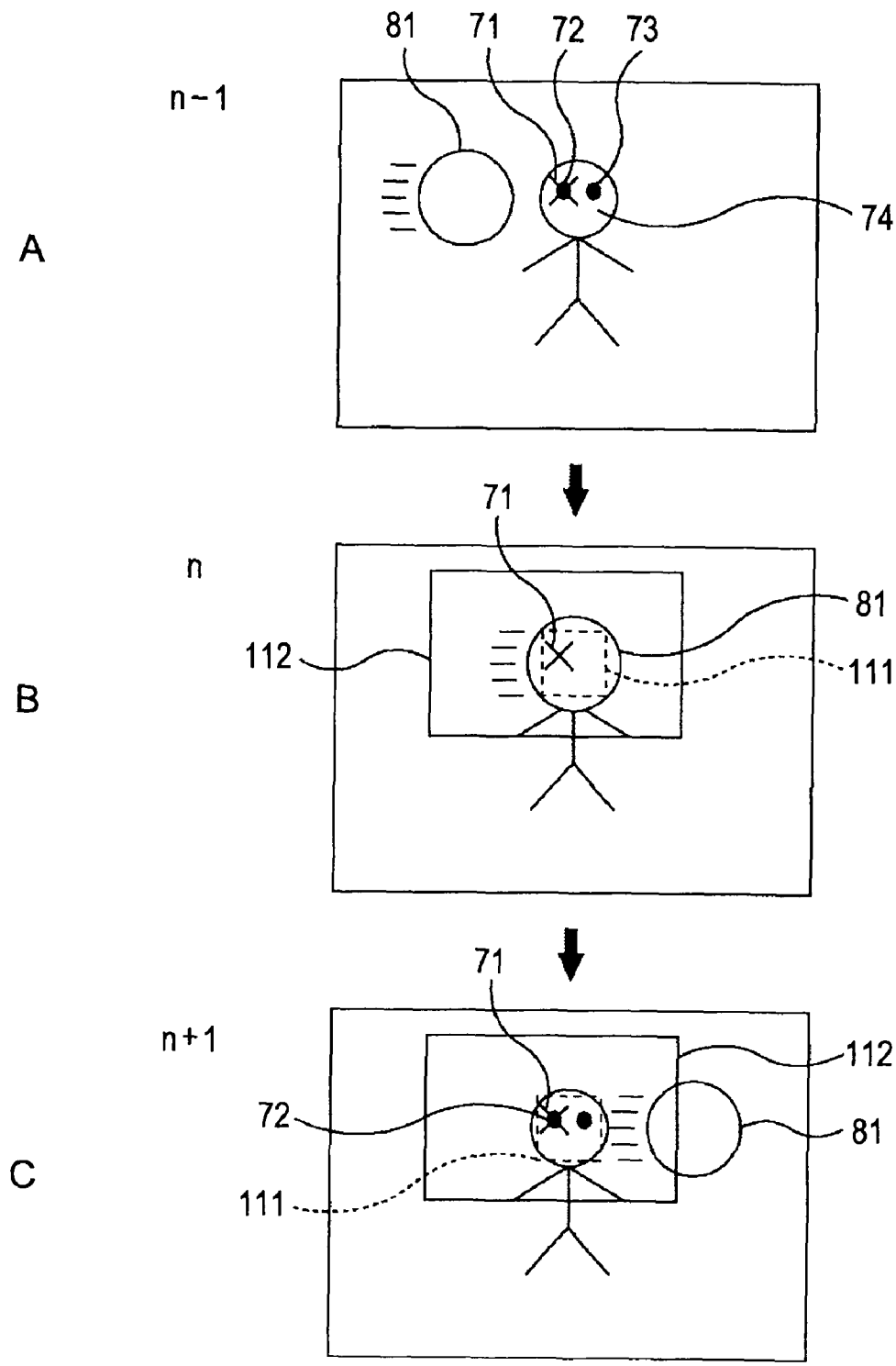
FIGS. 15A to 15C are diagrams illustrating setting of a search range.

That is, as shown in FIGS. 15A to 15C, suppose that, in FIG. 15A, the right eye 72 of the face 74 of a subject in the frame n is specified as the tracking point 71. The ball 81 is moving from the left. In the frame n+1 shown in FIG. 15B, the face 74 including the tracking point 71 is hidden by the ball 81. In the frame n+2 shown in FIG. 15C, the tracking point 71 reappears. In this case, the area at the center of which is the tracking point 71 (included in a template range 111) is determined to be a template search range 112.

In step S66, the template matching unit 51 resets the number of passed frames and the number of scene changes after the transition to the exception processing to zero. The number of passed frames and the number of scene changes are used in a continuation determination process performed in step S55 shown in FIG. 12 (in steps S71, S73, S75, and S77 shown in FIG. 16), which is described below. In this way, the initialization process of the exception processing is completed. Thereafter, the processing returns to step S52 shown in FIG. 12.

Figure 12:
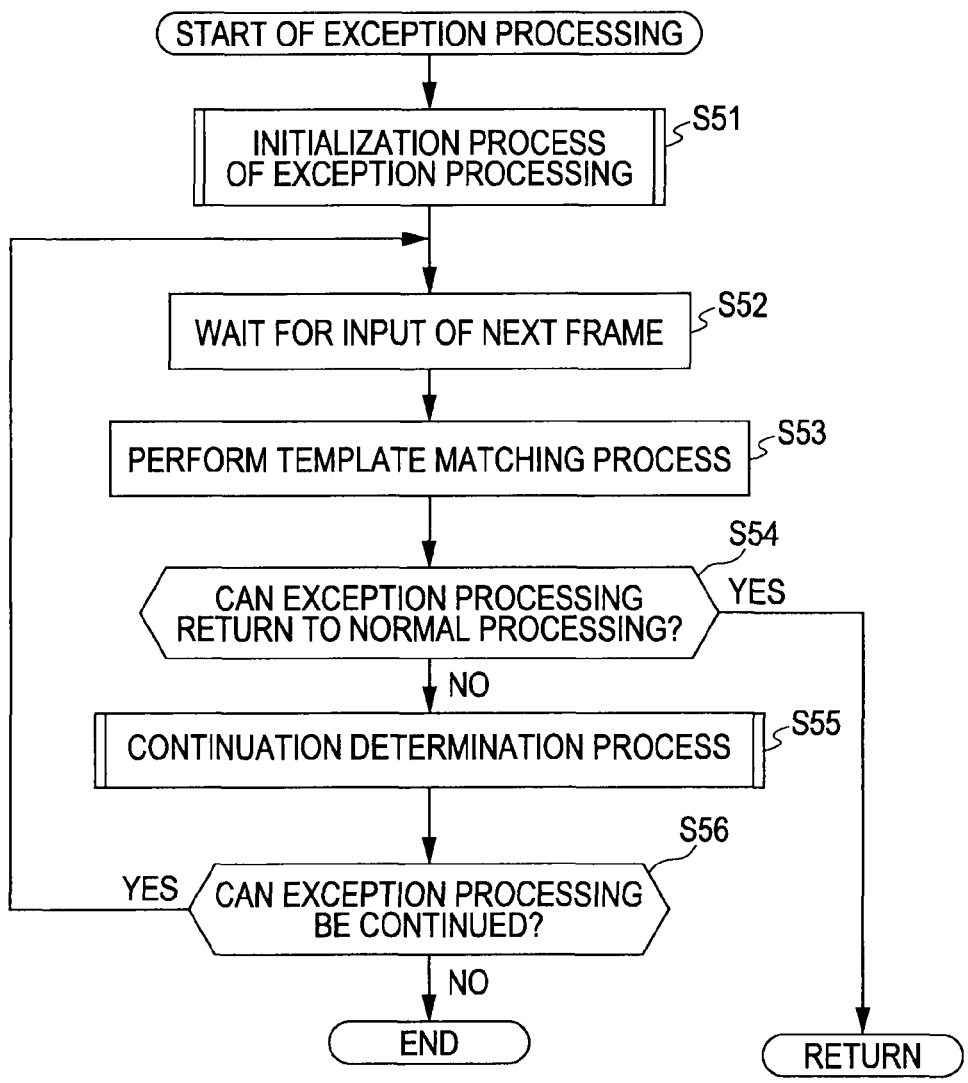
FIG. 12 is a flowchart illustrating exception processing.

In step S52 shown in FIG. 12, the control sub-unit 60 waits for input of the next frame. When the next frame is input, the template matching unit 51, in step S53, performs a template matching process inside the template search range.

In step S54, the template matching unit 51 determines whether the exception processing can be returned to the normal processing. More specifically, in the template matching process, the template matching unit 51 computes the sum of the absolute values of the differences between the pixel values of a template in a frame several frames ahead (pixel values in the template range 111 shown in FIG. 15) and the pixel values to be matched in the template search range. In this way, it is determined whether the return is possible on the basis of the computing result.

More precisely, the sum of absolute values of differences between pixel values of a predetermined block in the template range 111 and pixel values of a predetermined block in the template search range is computed. The position of the block in the template range 111 is sequentially moved, and the sum of absolute values of differences is added. The resultant value is defined as the value of the template at the position of the template. Thereafter, the position of the template at which the sum of absolute values of differences is minimized and the minimum value are searched for by sequentially moving the template in the template search range. The obtained minimum sum of absolute values of differences is compared with a predetermined threshold value. If the minimum sum of absolute differences is less than or equal to the threshold value, it can be determined that the object including the tracking point (included in the template) reappears (is displayed again), and therefore, it is determined that the return to the normal processing is possible. As a result, the normal processing performed in step S11 shown in FIG. 5 is resumed.

If, in step S54, it is determined that the return to the normal processing is difficult, the processing proceeds to step S55, where a continuation determination process is executed. The continuation determination process is described in more detail below with reference to FIG. 16. In this continuation determination process, it is determined whether the exception processing can be continued or not.

In step S56, the control sub-unit 60 determines whether the exception processing can be continued as the result of the continuation determination process performed in step S55. More specifically, the determination is made using flags set in step S76 or S78 shown in FIG. 16, which is described below. If the exception processing can be continued, the processing returns to step S52, and the processing subsequent to step S52 is repeated. That is, the process to wait until the tracking point reappears is repeatedly executed.

However, if, in step S56, it is determined that continuation of the exception processing is difficult (i.e., if it is determined at step S75 shown in FIG. 16 that the number of frames passed after the tracking point has disappeared is greater than or equal to a threshold value THfr or if it is determined at step S77 that the number of scene changes is greater than or equal to a threshold value THsc), further execution of the exception processing is difficult. Thus, the tracking process is completed.

Figure 16:
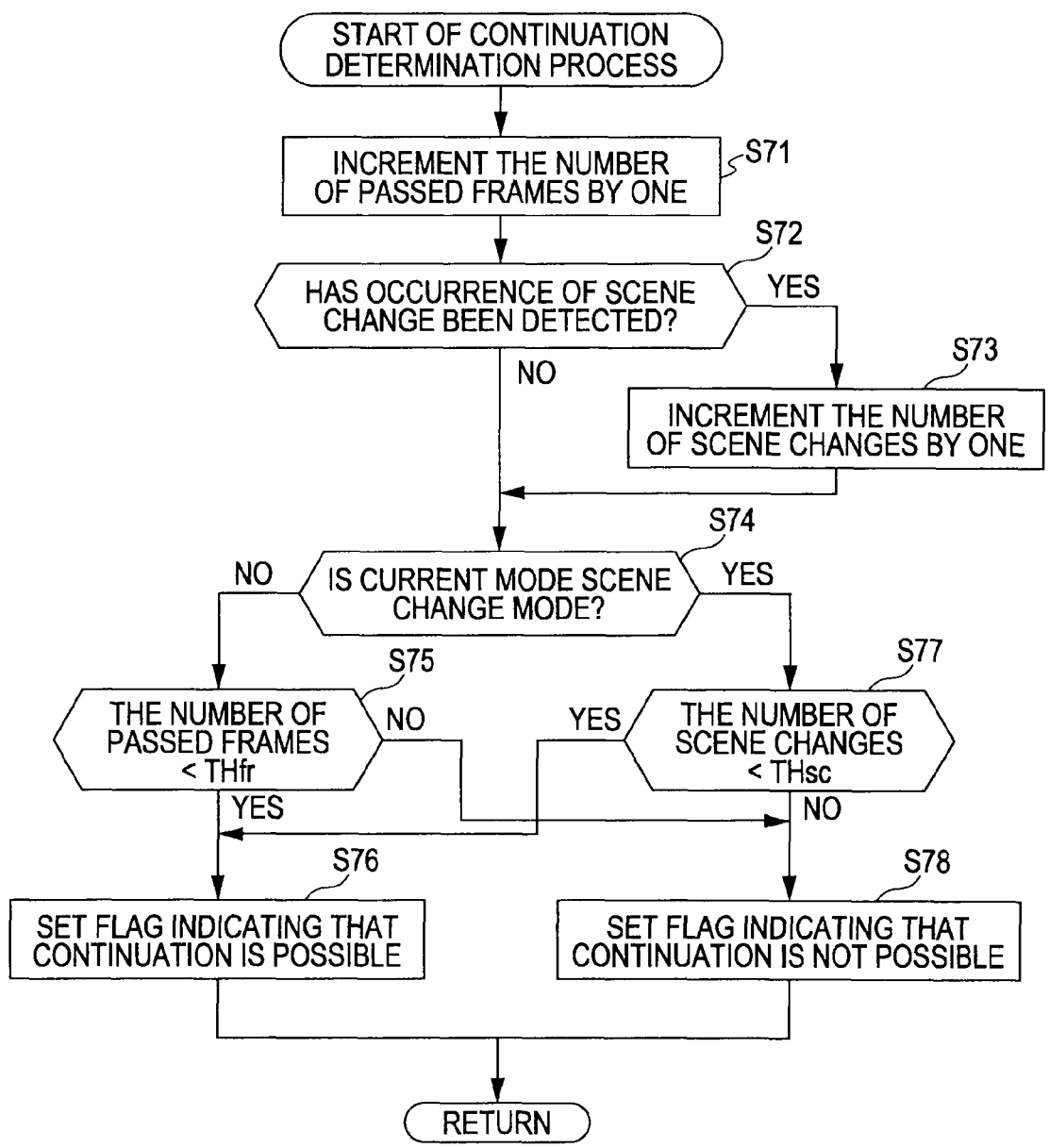
FIG. 16 is a flowchart illustrating an exemplary continuation determination process.

The continuation determination process performed in step S55 shown in FIG. 12 is described in detail next with reference to the flowchart shown FIG. 16.

In step S71, the control sub-unit 60 increments the number of passed frames serving as a variable by one. Note that the number of passed frames is reset to zero in advance in the initialization process (refer to step S66 shown in FIG. 13) of the exception processing performed in step S51 shown in FIG. 12.

In step S72, the control sub-unit 60 determines whether a scene change was detected by the scene change detecting unit 53 when the normal processing was transferred to the exception processing. If a scene change was detected, the processing proceeds to step S73, where the control sub-unit 60 increments the number of scene changes serving as a variable by one. Note that the number of scene changes is also reset to zero in advance in the initialization process (refer to step S66 shown in FIG. 13) of the exception processing performed in step S51 shown in FIG. 12. If, in step S72, it is determined that a scene change was not detected when the normal processing was transferred to the exception processing, the processing performed in step S73 is skipped.

Subsequently, in step S74, the control sub-unit 60 determines whether the mode currently being set is a scene change mode or not. This mode is set in the initialization process (refer to step S62 or S63 shown in FIG. 13) of the exception processing.

If the mode currently being set is a scene change mode, the processing proceeds to step S77, where the control sub-unit 60 determines whether the number of scene changes is less than the predetermined threshold value THsc. If the number of scene changes is less than the predetermined threshold value THsc, the processing proceeds to step S76, where the control sub-unit 60 sets a flag indicating that the continuation is possible. However, if, in step S77, it is determined that the number of scene changes is greater than or equal to the predetermined threshold value THsc, the processing proceeds to step S78, where the control sub-unit 60 sets a flag indicating that the continuation is not possible.

In contrast, if, in step S74, it is determined that the mode currently being set is not a scene change mode (if it is determined that the mode is another mode), the processing proceeds to step S75, where the control sub-unit 60 determines whether the number of passed frames is less than the predetermined threshold value THfr. If it is determined that the number of passed frames is less than the predetermined threshold value THfr, the processing proceeds to step S76, where the flag indicating that the continuation is possible is set. However, if, in step S75, it is determined that the number of passed frames is greater than or equal to the predetermined threshold value THfr, the processing proceeds to step S78, where the control sub-unit 60 sets the flag indicating that the continuation is not possible.

As described above, if the number of scene changes in the template matching process is greater than or equal to the threshold value THsc or if the number of passed frames is greater than or equal to the threshold value THfr, it is determined that the further performance of the exception processing is not allowed.

If the mode is another mode, it may be determined whether the continuation is possible or not while taking into account the condition that the number of scene changes is zero.

While the foregoing description has been made with reference to the case where the processing is executed on a frame-by-frame basis of the image and all of the frames are used for the processing, the processing may be executed on a field-by-field basis. In addition, in place of using all of the frames or all of the fields, frames or fields extracted by thinning out frames or fields in predetermined intervals may be used for the processing.

Figure 4:
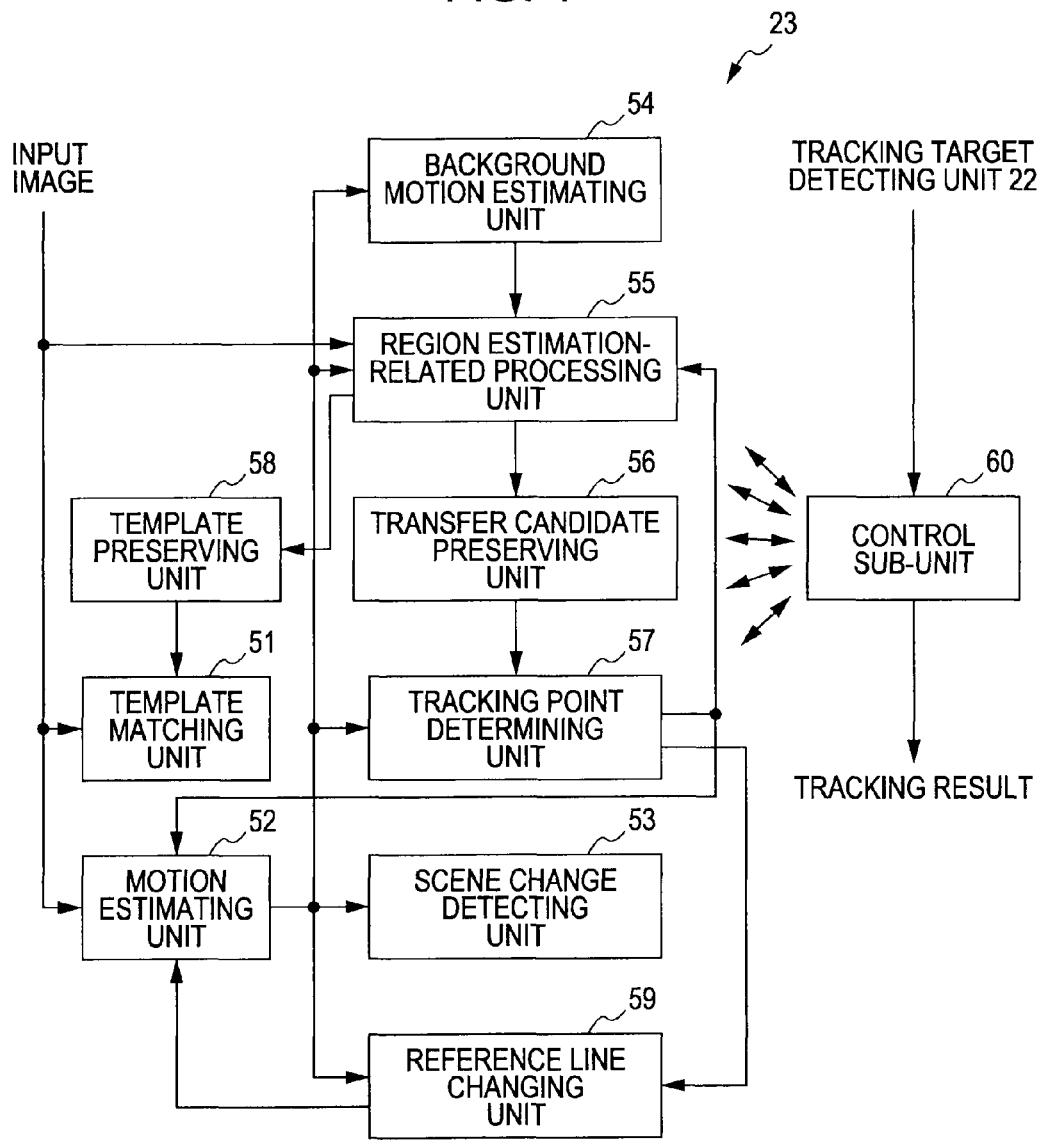
FIG. 4 is a block diagram illustrating an exemplary configuration of an object tracking unit shown in FIG. 1.
Figure 17:
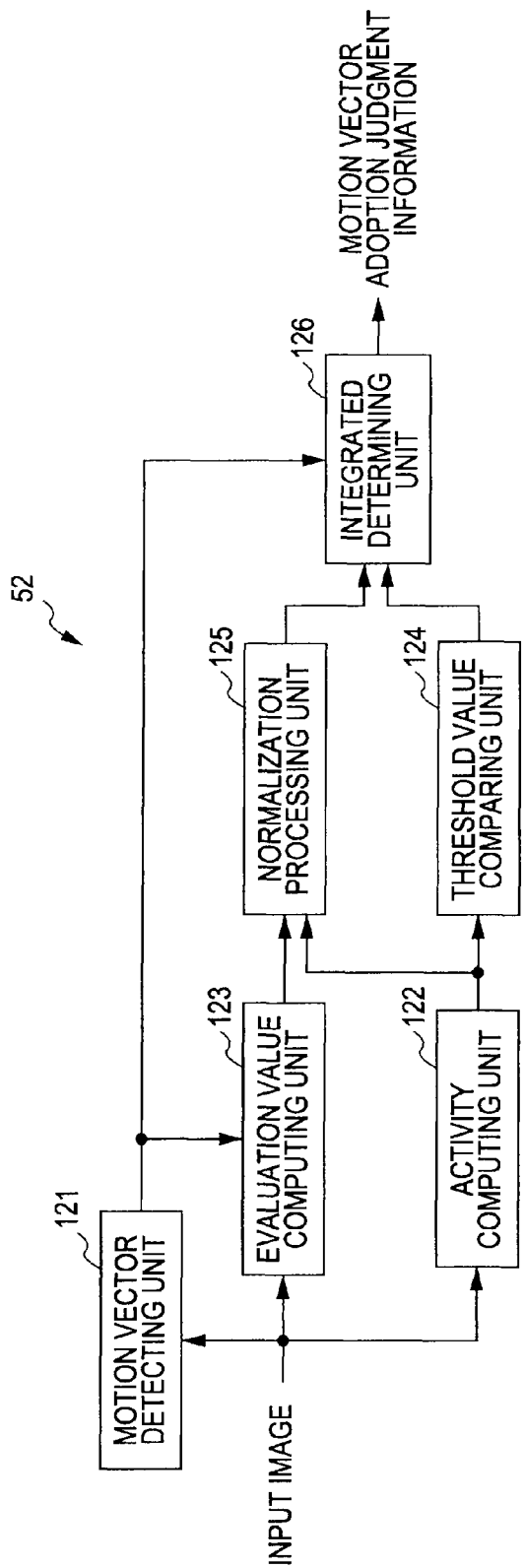
FIG. 17 is a block diagram illustrating an exemplary configuration of a motion estimating unit shown in FIG. 4.

An exemplary configuration of the motion estimating unit 52 shown in FIG. 4 is described next with reference to FIG. 17. The motion estimating unit 52 includes a motion vector detecting unit 121, an activity computing unit 122, an evaluation value computing unit 123, a threshold value comparing unit 124, a normalization processing unit 125, and an integrated determining unit 126.

The motion vector detecting unit 121 detects a motion vector of a tracking point between two frames of an input image using, for example, a block matching method or a gradient method. Subsequently, the motion vector detecting unit 121 supplies the detected motion vector to the evaluation value computing unit 123 and the integrated determining unit 126.

The activity computing unit 122 computes the block activity of the tracking point in the input image. Subsequently, the activity computing unit 122 supplies the block activity to the threshold value comparing unit 124 and the normalization processing unit 125.

The block activity is described next. As used herein, the term "block activity" refers to a value indicating the complexity or the spatial correlation of an image. The activity of a pixel of interest is defined as the average of the absolute values of differences between the pixel of interest and the surrounding 8 pixels in eight directions (the vertical, horizontal, and diagonal directions).

Figure 18:
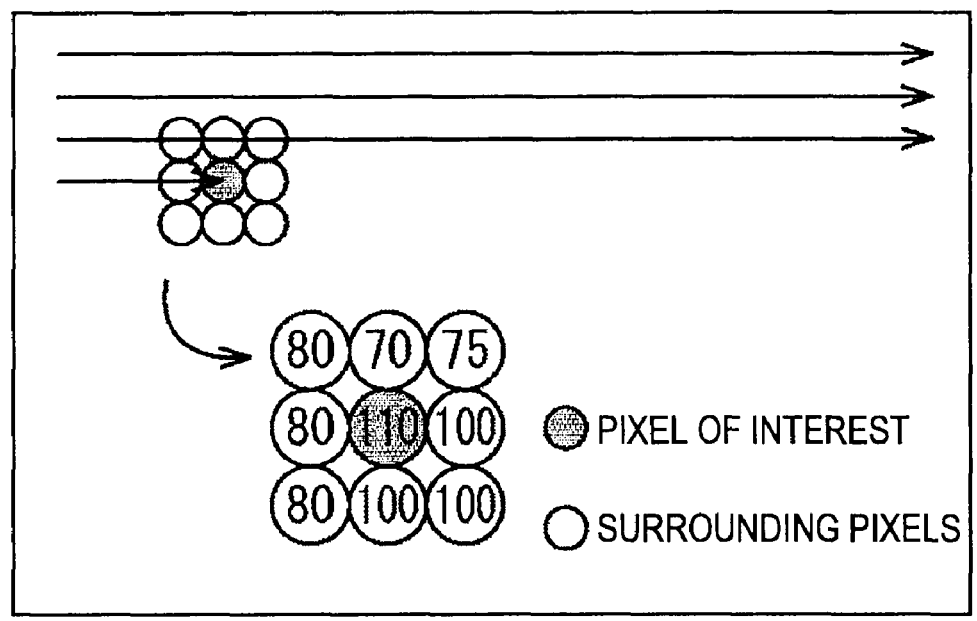
FIG. 18 is a diagram illustrating computation of a block activity.

For example, when the pixel of interest and the surrounding 8 pixels have pixel values as shown in FIG. 18, the activity of the pixel of interest can be computed as follows:

The activity of the pixel of interest={|180−110|+|70−110|+|75−110|+|100−110|+|100−110|+|100−|110|+|80−110|+|80−110|}/8=24.375

The block activity can be obtained by sequentially setting a pixel of a pixel block having a predetermined size to the pixel of interest, computing the activities of the pixels, and summing the computed activities of the pixels of the pixel block.

Note that a value other than the values computed as described above may be used for the block activity. For example, the variance or the dynamic range may be used for the block activity.

The activity computing unit 122 computes the block activity by determining a pixel block of a predetermined size at the center of which is the tracking point.

The evaluation value computing unit 123 computes an evaluation value indicating the similarity between two pixel blocks having a predetermined size and each including the tracking point in the two corresponding frames associated with the motion vector detected by the motion vector detecting unit 121. The evaluation value computing unit 123 then supplies the evaluation value to the normalization processing unit 125. More specifically, the sum of absolute values of differences between the pixel values in the two pixel blocks is computed. If the motion vector detecting unit 121 employs a block matching method, the sum of absolute values of differences between the pixel values in the two pixel blocks has already been computed in order to detect the motion vector. Accordingly, that value may be used for the evaluation value.

The threshold value comparing unit 124 compares the block activity computed by the activity computing unit 122 with a predetermined threshold value THa (see FIG. 20) and outputs a flag indicating the comparison result to the integrated determining unit 126. The normalization processing unit 125 normalizes the evaluation value supplied from the evaluation value computing unit 123 and the block activity supplied from the activity computing unit 122 by dividing each of these values by its maximum value. The normalization processing unit 125 then outputs the normalized evaluation value and the normalized block activity to the integrated determining unit 126.

Figure 20:
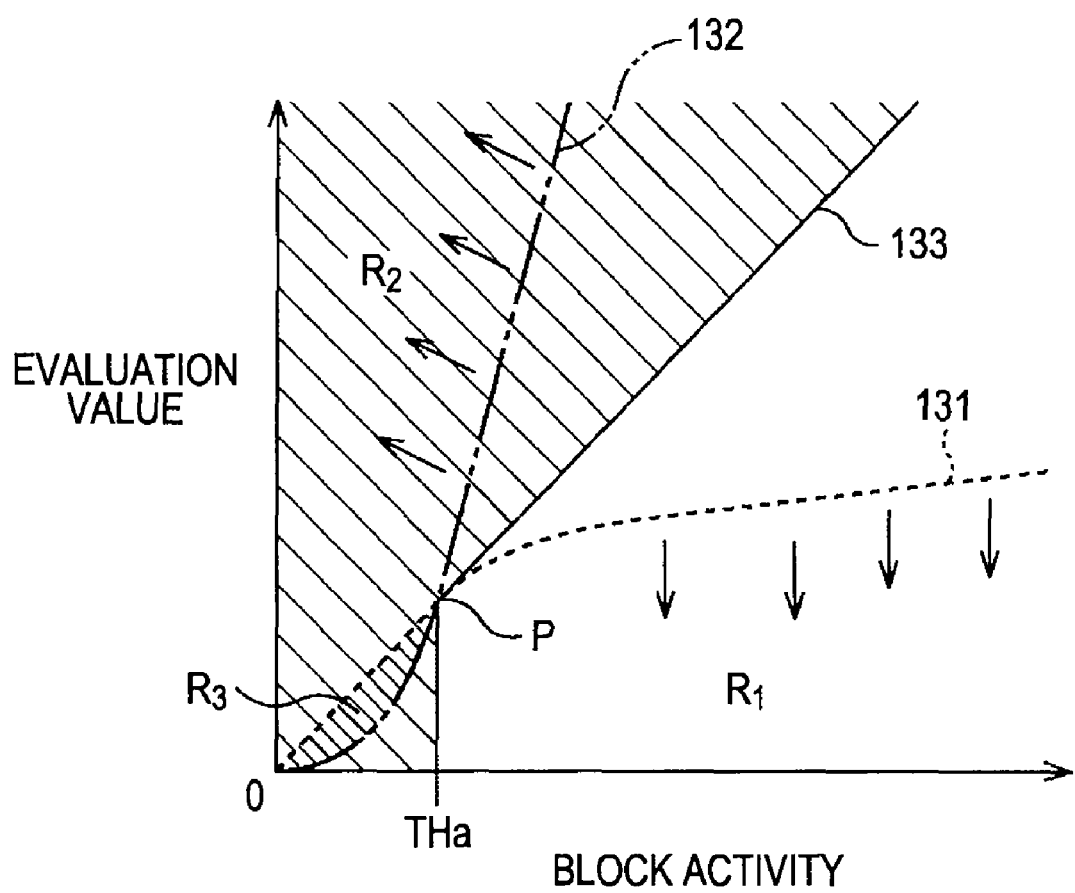
FIG. 20 illustrates a relationship between an evaluation value and the block activity.

The integrated determining unit 126 compares each of the normalized evaluation value and the block activity supplied from the normalization processing unit 125 with the reference line 133 (see FIG. 20). The integrated determining unit 126 then determines whether the motion vector is adopted on the basis of this comparison result and the flag indicating the comparison result output from the threshold value comparing unit 124. Thereafter, the integrated determining unit 126 supplies, to the downstream units, the motion vector and adoption judgment information indicating whether the motion vector can be adopted.

Figure 19:
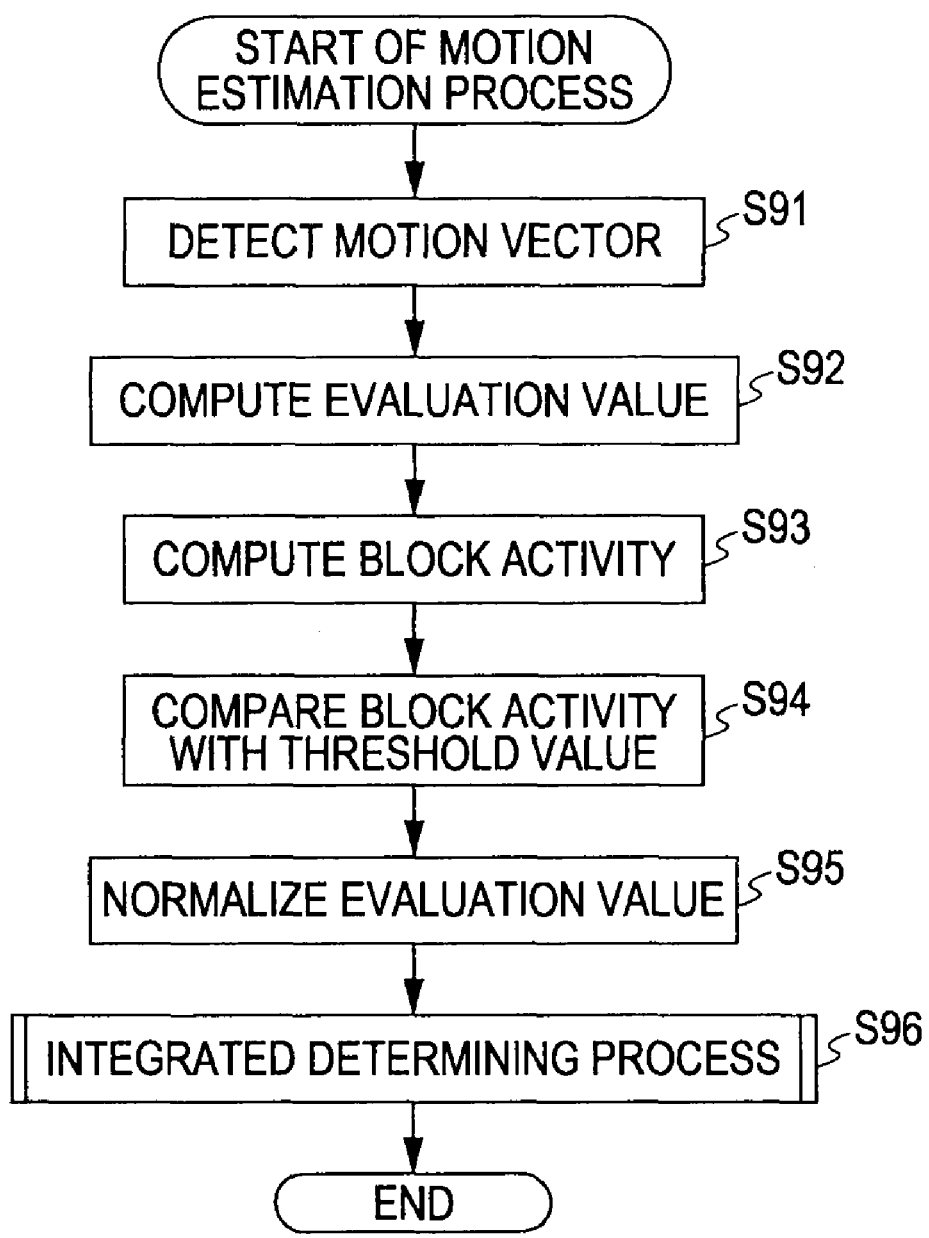
FIG. 19 is a flowchart illustrating an exemplary motion estimation process.

An exemplary motion estimation process performed by the motion estimating unit 52 is described next with reference to the flowchart shown in FIG. 19.

In step S91, the motion vector detecting unit 121 detects a motion vector between two frames of the input image including the tracking point and supplies the detected motion vector to the evaluation value computing unit 123 and the integrated determining unit 126.

In step S92, the evaluation value computing unit 123 computes the evaluation value of the motion vector detected in step S91. More specifically, for example, the evaluation value computing unit 123 computes the sum of absolute values of differences between pixel values in two blocks including two points associated with the motion vector. The sum serves as an evaluation value. As the evaluation value approaches zero, the two blocks become more similar, that is, the reliability of the motion vector becomes higher. The computed evaluation value is supplied to the normalization processing unit 125.

In step S93, the activity computing unit 122 computes the block activity of the tracking point in the input image. The activity computing unit 122 then supplies the computed block activity to the threshold value comparing unit 124 and the normalization processing unit 125.

In step S94, the threshold value comparing unit 124 compares the block activity computed in step S93 with the threshold value THa. The threshold value comparing unit 124 then sends, to the integrated determining unit 126, a flag indicating whether the block activity is greater than the threshold value THa.

In step S95, the normalization processing unit 125 normalizes the evaluation value supplied from the evaluation value computing unit 123 and the block activity supplied from the activity computing unit 122 by dividing each of these values by its maximum value. The normalization processing unit 125 then supplies the normalized evaluation value and the normalized block activity to the integrated determining unit 126.

In step S96, the integrated determining unit 126 compares each of the normalized evaluation value and the block activity supplied from the normalization processing unit 125 with the reference line 133. The integrated determining unit 126 then performs an integrated determination process for determining whether the motion vector is adopted on the basis of this comparison result and the flag indicating the comparison result output from the threshold value comparing unit 124. Thereafter, the integrated determining unit 126 supplies, to the downstream unit, the motion vector and the determination result indicating whether the motion vector can be adopted.

An exemplary integrated determination process performed by the integrated determining unit 126 in step S96 is described in detail next. Before the description of the integrated determination process, a relationship between the evaluation value and the block activity used for determination of adoption of the motion vector is described.

FIG. 20 illustrates a relationship between the evaluation value and the block activity corresponding to the detected motion vector. The abscissa represents the normalized block activity, and the ordinate represents the normalized evaluation value.

In general, the statistics indicates that, as the block activity increases and the evaluation value decreases, the accuracy of the corresponding motion vector becomes higher. Accordingly, in FIG. 20, the lower right is a reliable area, whereas the upper left is an unreliable area.

In practice, when the values of the block activity and the evaluation values corresponding to a properly detected motion vector are plotted on the abscissa and ordinate, respectively, (hereinafter these points are referred to as "sample points"), the sample points are distributed in an area R1 located below a curve 131 shown in FIG. 20. In contrast, when sample points corresponding to an improperly detected motion vector are plotted, the sample points are distributed in an area R2 located in the left of a curve 132 shown in FIG. 20.

Therefore, a straight line passing through the origin and having a slope of 1 is determined as the reference line 133. A motion vector having sample points plotted in an area below the reference line 133 (including the reference line 133) is considered as a reliable motion vector, and therefore, the motion vector is adopted. In contrast, a motion vector having sample points plotted in an area above the reference line 133 is considered as an unreliable motion vector, and therefore, the motion vector is not adopted.

However, even when the sample points are plotted below the reference line 133, a motion vector corresponding to sample points plotted in an area R3 (indicated by hatchings) may be unreliable. Accordingly, the abscissa (the block activity) of an intersecting point P between the curve 131 and the curve 132 is determined to be the threshold value THa. If the block activity is less than the threshold value THa, the corresponding motion vector is considered as an unreliable motion vector, and therefore, the motion vector is not adopted.

It should be noted that the slope of the reference line used for determination of adoption of a motion vector is not limited to 1. For example, the slope may be predetermined on the basis of an ideal image.

In addition, the reference line is not a fixed line. The reference line can be changed by the reference line changing unit 59. How the reference line is changed is described below with reference to FIG. 22 and the subsequent figures.

Figure 21:
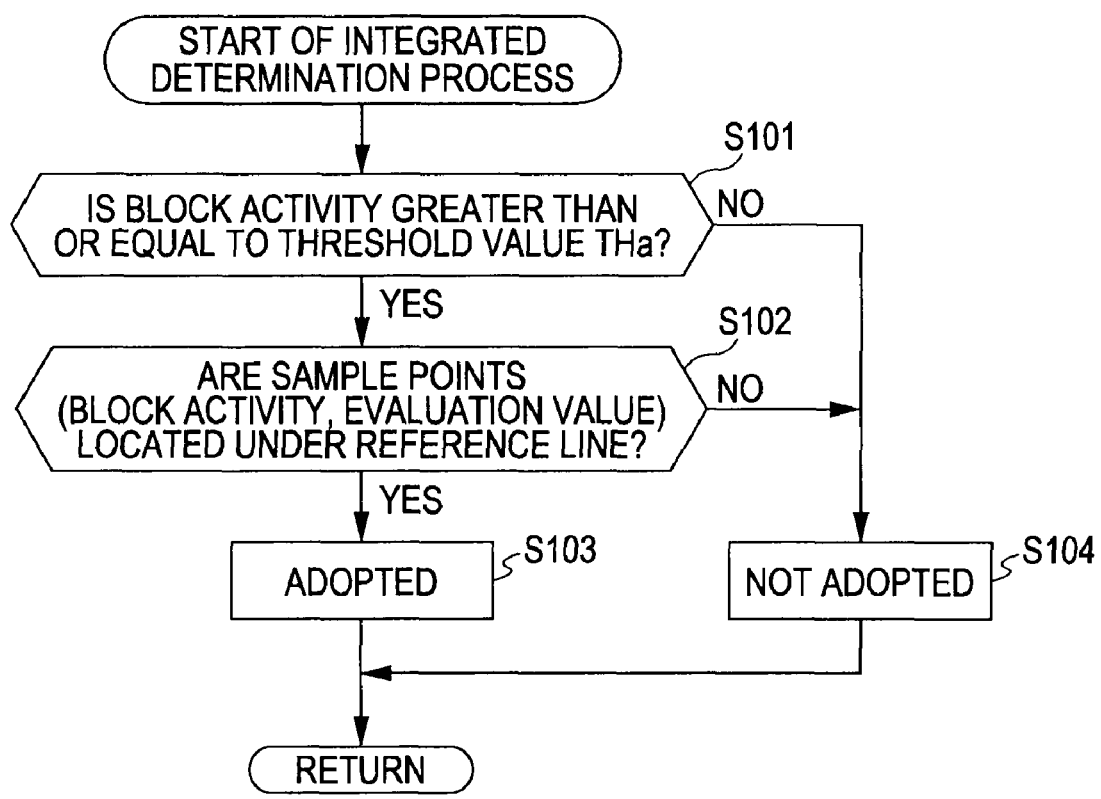
FIG. 21 is a flowchart illustrating an exemplary integrated determination process.

An exemplary integrated determination process performed in step S96 is described in detail next with reference to the flowchart shown in FIG. 21.

In step S101, the integrated determining unit 126 determines whether the block activity is greater than or equal to the threshold value THa. This determination is made by using the flag sent from the threshold value comparing unit 124 in step S94. If the block activity is greater than or equal to the threshold value THa, the processing proceeds to step S102.

In step S102, the integrated determining unit 126 determines whether the sample points generated from the normalized evaluation value and block activity supplied from the normalization processing unit 125 are to be plotted under the reference line. If the sample points are to be plotted under the reference line, the processing proceeds to step S103, where the integrated determining unit 126 determines that the motion vector supplied from the motion vector detecting unit 121 is adopted.

However, if, in step S101, the block activity is not greater than or equal to the threshold value THa or if, in step S102, the sample points are not to be plotted under the reference line, the processing proceeds to step S104. In step S104, the integrated determining unit 126 determines that the motion vector supplied from the motion vector detecting unit 121 is not adopted. In this way, the integrated determination process is performed.

The reference line changing unit 59 shown in FIG. 4 is described next. The reference line changing unit 59 is provided for the following reason.

Figure 22:
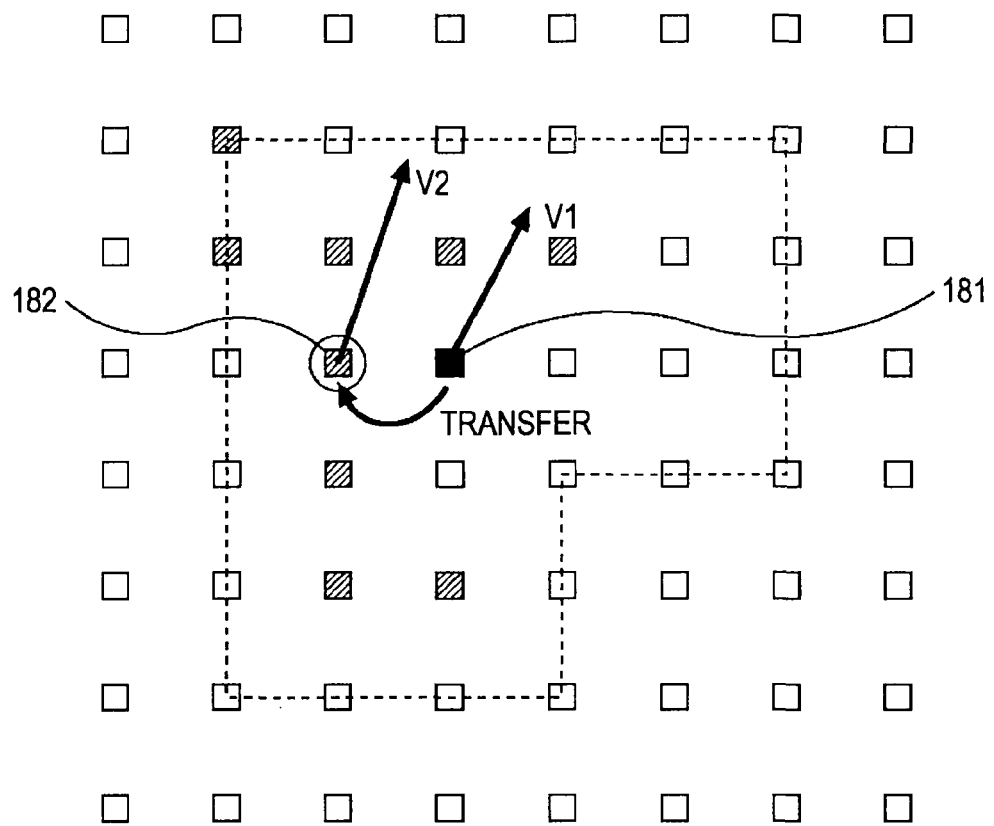
FIG. 22 is a diagram illustrating an exemplary reference line changing process.
Figure 23:
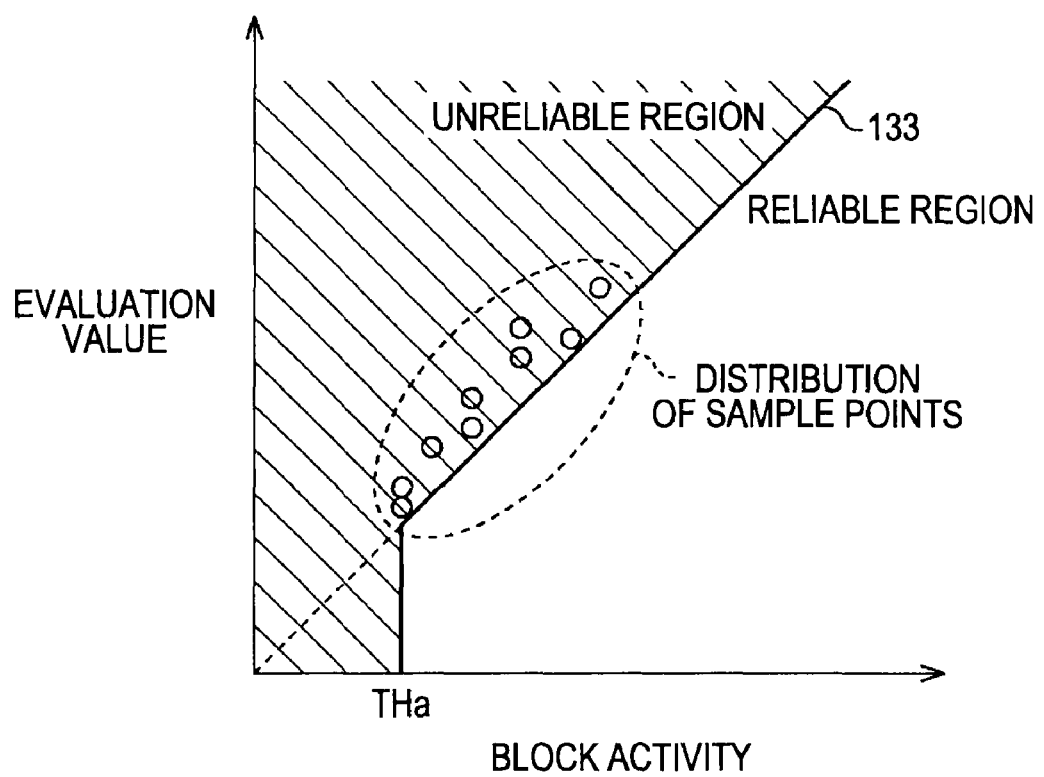
FIG. 23 is a diagram illustrating an error in judgment regarding adoption of a motion vector.

That is, assume the case where transfer of the tracking point occurs and, as shown in FIG. 22, a motion vector V1 corresponding to a tracking point 181 to be transferred is substantially the same as a motion vector V2 corresponding to a new tracking point 182 after transfer (i.e., the difference between the motion vector V1 and the motion vector V2 is within a predetermined range). Furthermore, the user does not instruct to correct the position of the tracking point. Then, it can be considered that the determination that the motion vector corresponding to the new tracking point is not adopted is not correct. That is, it can be considered that the sample points are distributed as shown in FIG. 23. In such a case, it can be considered that the reference line 133 compared with the sample points (the points determined when the normalized block activity is mapped to the abscissa and the normalized evaluation value is mapped to the ordinate) of the motion vector corresponding to the tracking point to be transferred is not proper.

Accordingly, when transfer of the tracking point occurs, the reference line changing unit 59 determines whether a motion vector corresponding to a tracking point to be transferred is substantially the same as a motion vector corresponding to a new tracking point after transfer. If the two motion vectors are substantially the same, the reference line changing unit 59 accumulates the sample points of the motion vector corresponding to the tracking point to be transferred as sampling points. If a sufficient number of sample points are accumulated or if the user instructs to correct the position of the tracking point, the reference line changing unit 59 estimates a proper reference line on the basis of the accumulated sample points.

Figure 24:
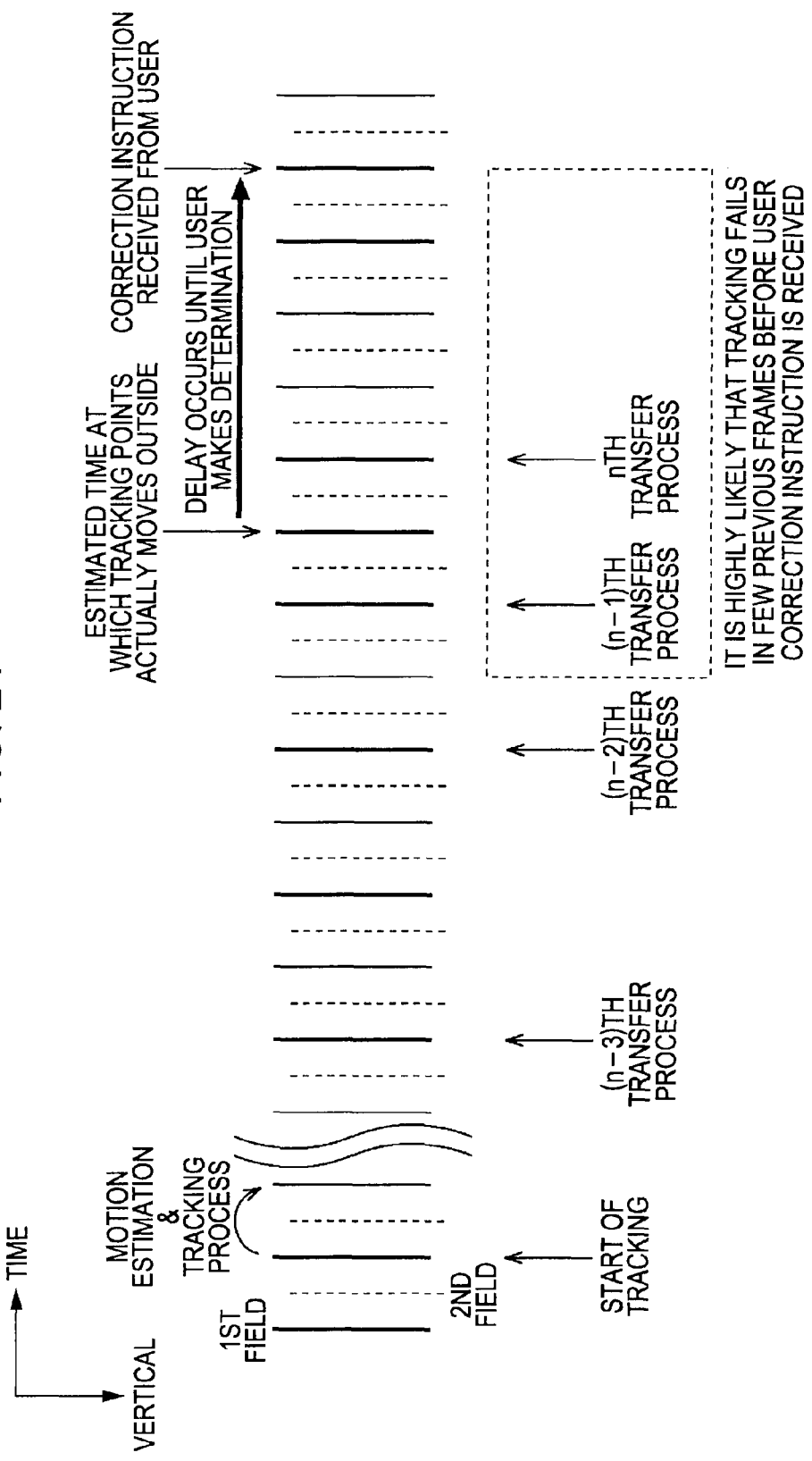
FIG. 24 is a diagram illustrating a delay of instruction timing.

However, as shown in FIG. 24, since the user instruction to correct the position of the tracking point may be delayed, the sampling points corresponding to transfer occurring during a predetermined period of time before the user instruction is input are not used for the estimation.

In addition, when sample points are accumulated and if some of the sample points have the same abscissa (the same normalized block activity), only the sample point having the highest evaluation value is accumulated. In this way, the number of the accumulated sample points can be reduced, and therefore, the capacity of a sample point accumulating unit 172 (refer to FIG. 26) can be reduced.

Figure 25:
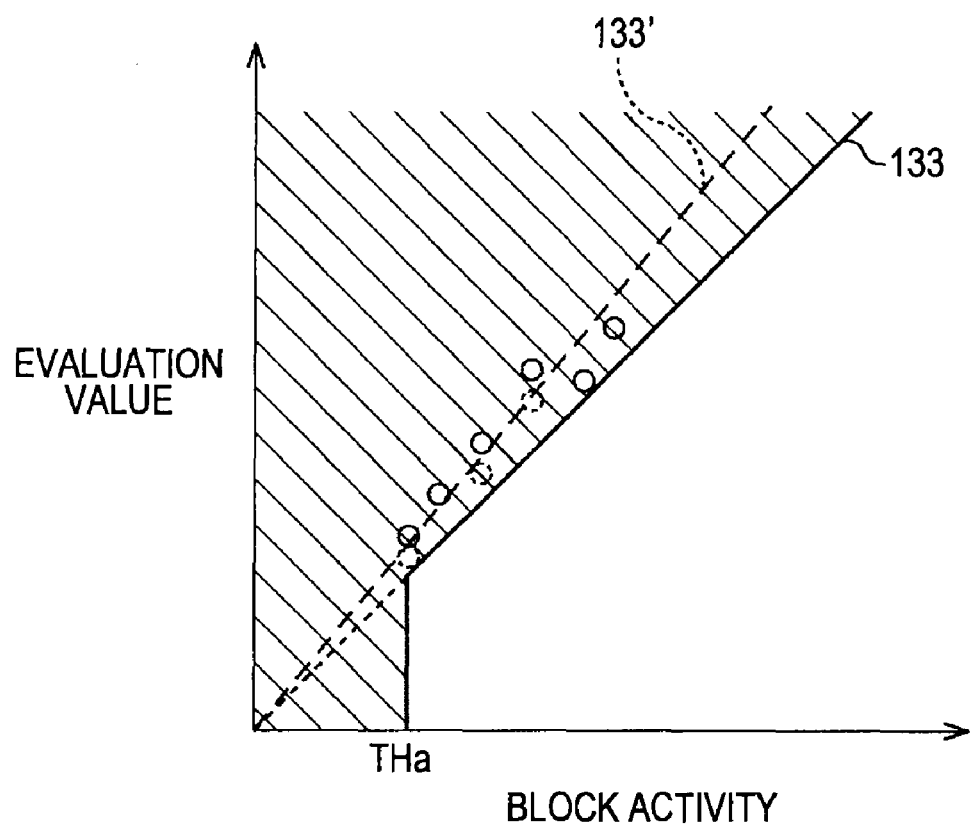
FIG. 25 is a diagram illustrating a changed reference line.

In order to estimate a reference line on the basis of the accumulated sample points, a regression analysis method may be used, for example. Thus, as shown in FIG. 25, a line 133' passing through the center of the sample points can be computed. Alternatively, a line for which all of the accumulated sample points are determined to be adopted (a line extending above all of the sample points and having a minimum slope) may be computed.

Figure 26:
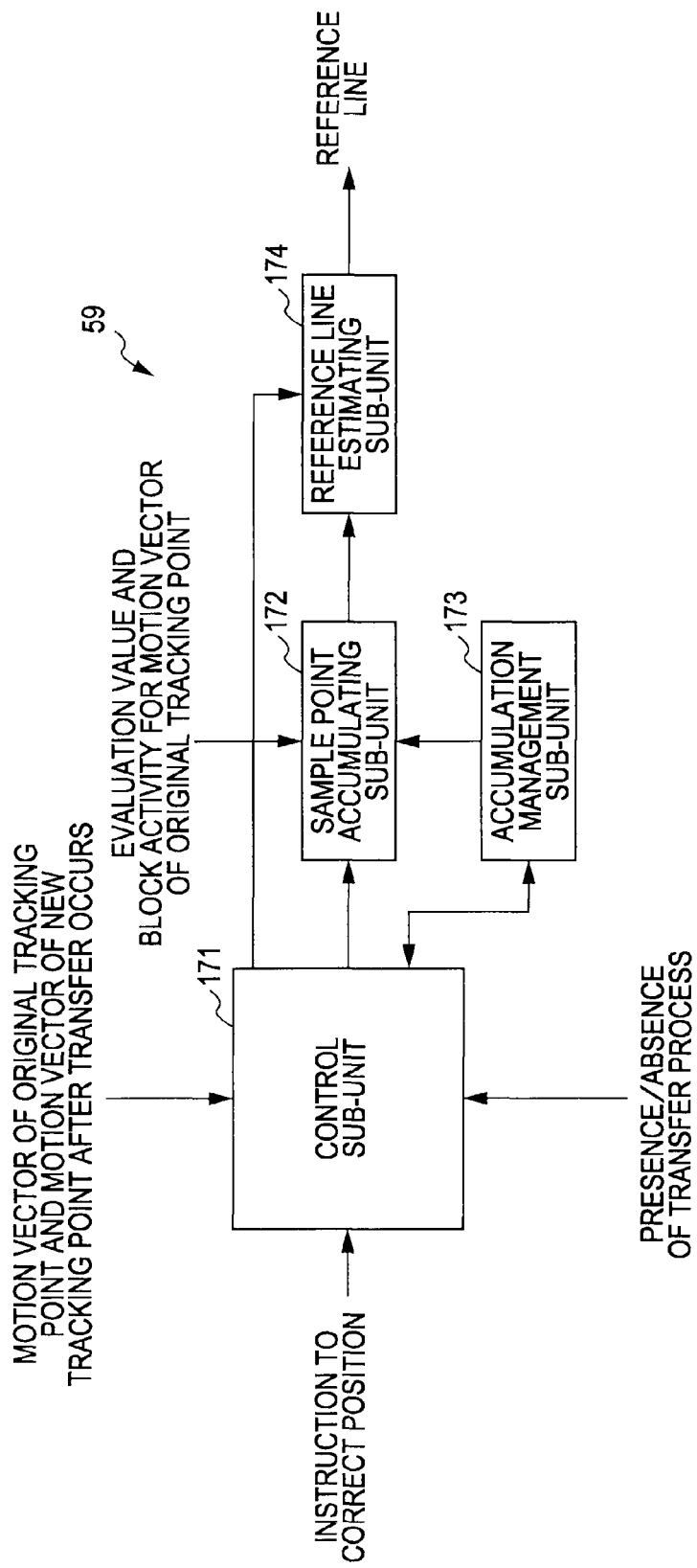
FIG. 26 is a block diagram illustrating an exemplary configuration of a reference line changing unit shown in FIG. 4.

FIG. 26 illustrates a detailed exemplary configuration of the reference line changing unit 59. The reference line changing unit 59 includes a control sub-unit 171, the sample point accumulating sub-unit 172, an accumulation management sub-unit 173, and a reference line estimating sub-unit 174.

The control sub-unit 171 controls all of the sub-units of the reference line changing unit 59 using a message sent from the tracking point determining unit 57 and indicating that transfer of the tracking point occurred, the motion vector supplied from the motion estimating unit 52, and a message sent from the control unit 27 and indicating that a user has instructed to correct the position of the tracking point.

More specifically, upon receiving, from the tracking point determining unit 57, a message indicating that transfer of the tracking point occurred, the control sub-unit 171 causes the sample point accumulating sub-unit 172 to accumulate the sample points of the motion vector corresponding to the racking point to be transferred if, as shown in FIG. 23, the motion vector V1 corresponding to the tracking point 181 to be transferred is substantially the same as the motion vector V2 corresponding to the new tracking point 182 after transfer (i.e., if the difference between the motion vector V1 and the motion vector V2 stays within a predetermined range). Subsequently, when a sufficient number of the sample points or when the user instructs to correct the position of the tracking point, the control sub-unit 171 causes the reference line estimating sub-unit 174 to estimate a new reference line on the basis of the sample points accumulated before receiving the user instruction.

The sample point accumulating sub-unit 172 accumulates sample points supplied from the motion estimating unit 52. The sample points have the ordinate and the abscissa representing the normalized evaluation value and the normalized block activity of the motion vector, respectively. The accumulation management sub-unit 173 initializes the sample point accumulating sub-unit 172, reduces the number of sample points, and detects the number of accumulated sample points.

The reference line estimating sub-unit 174 estimates a new reference line that replaces the current reference line on the basis of the sample points accumulated in the sample point accumulating sub-unit 172. The reference line estimating sub-unit 174 then sends information about the new reference line to the motion estimating unit 52.

Figure 27:
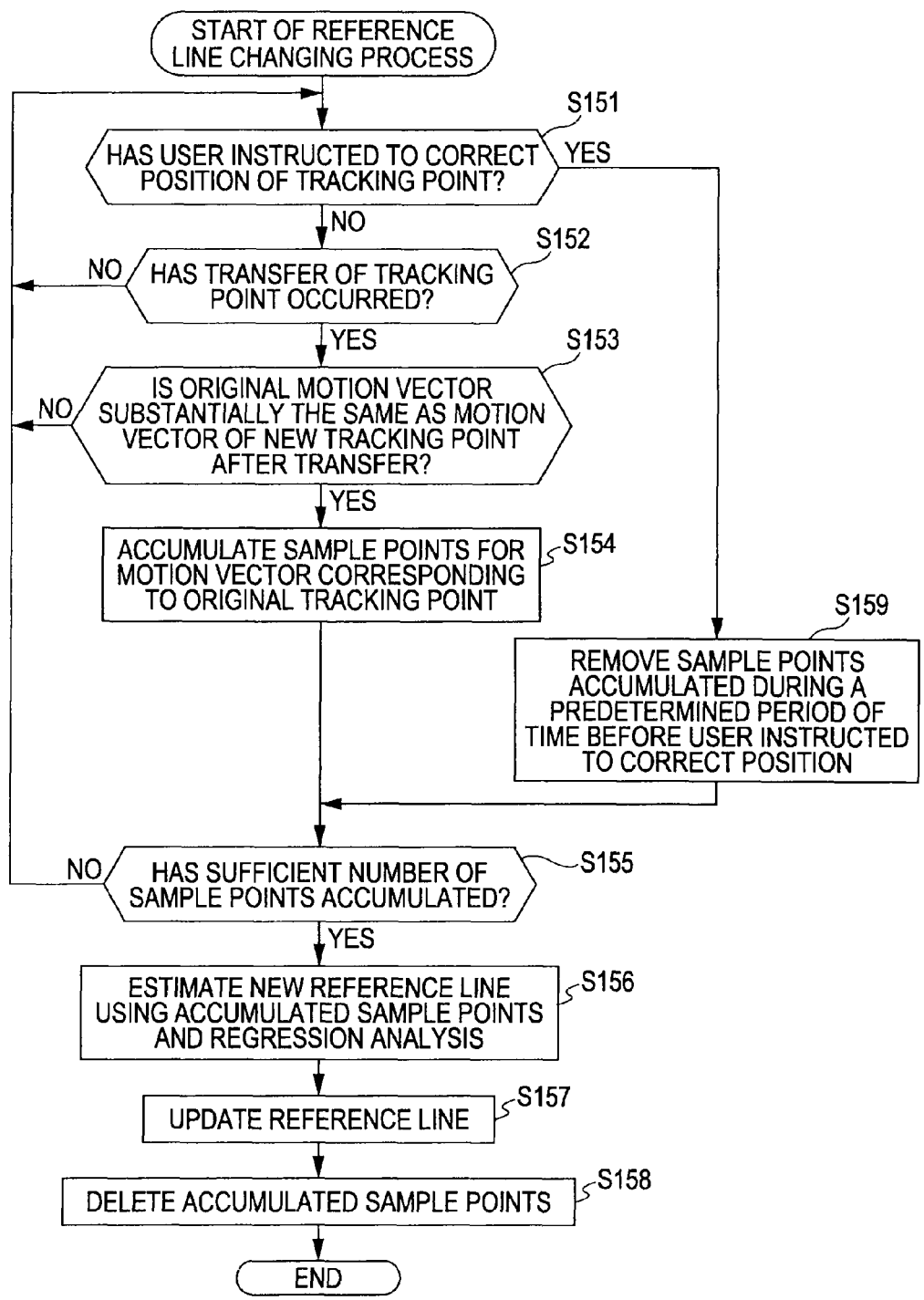
FIG. 27 is a flowchart illustrating an exemplary reference line changing process.

An exemplary reference line changing process performed by the reference line changing unit 59 is described next with reference to the flowchart shown in FIG. 27. The reference line changing process is performed concurrently with the above-described tracking process.

In step S151, the control sub-unit 171 determines whether the user has instructed to correct the position of the tracking point on the basis of the message received from the control unit 27. If the user has instructed to correct the position of the tracking point, the processing proceeds to step S152.

In step S152, the control sub-unit 171 determines whether transfer of the tracking point has occurred on the basis of the message received from the tracking point determining unit 57. If it is determined that transfer of the tracking point has not occurred, the processing returns to step S151, and the subsequent processing is repeated.

However, if, in step S152, it is determined that transfer of the tracking point has occurred, the processing proceeds to step S153. In step S153, the control sub-unit 171 determines whether the motion vector supplied from the motion estimating unit 52 and corresponding to the tracking point to be transferred is substantially the same as the motion vector corresponding to a new tracking point after transfer (i.e., whether the difference between the motion vectors is within a predetermined range). If the motion vectors are not substantially the same, the processing returns to step S151, and the subsequent processing is repeated.

However, if, in step S153, it is determined that the motion vector corresponding to the tracking point to be transferred is substantially the same as the motion vector corresponding to a new tracking point after transfer, the processing proceeds to step S154.

In step S154, under the control of the control sub-unit 171, the sample point accumulating sub-unit 172 accumulates sample points supplied from the motion estimating unit 52 and each having the ordinate and the abscissa representing the normalized evaluation value and the normalized block activity of the motion vector corresponding to the original tracking point, respectively. At that time, if the block activity of the sample point is the same as that of the already accumulated sample point, the accumulation management sub-unit 173 accumulates only the sample point having a higher evaluation value.

In step S155, the accumulation management sub-unit 173 determines whether a number of sample points sufficient to estimate a reference line (i.e., a predetermined number of sample points) have accumulated. If it is determined that a sufficient number of sample points have not accumulated, the processing returns to step S151, and the subsequent processing is repeated.

However, if, in step S155, it is determined that a sufficient number of sample points have accumulated, the processing proceeds to step S156. In step S156, the accumulation management sub-unit 173 sends, to the control sub-unit 171, a message indicating that a sufficient number of sample points have accumulated. Upon receiving the message, the control sub-unit 171 controls the reference line estimating sub-unit 174 so that the reference line estimating sub-unit 174 estimates a new reference line that replaces the current reference line on the basis of the sample points accumulated in the sample point accumulating sub-unit 172. In step S157, the reference line estimating sub-unit 174 sends information about the new estimated reference line to the motion estimating unit 52. The motion estimating unit 52 replaces the reference line used for determination of adoption of a motion vector with the received reference line.

In step S158, the accumulation management sub-unit 173 deletes the sample points accumulated in the sample point accumulating sub-unit 172. Thereafter, the reference line changing process is repeated from step S151.

Note that, if, in step S151, it is determined that the user has instructed to correct the position of the tracking point, the processing proceeds to step S159.

In step S159, under the control of the control sub-unit 171, from among the sample points accumulated in the sample point accumulating sub-unit 172, the accumulation management sub-unit 173 removes only the sample points accumulated in accordance with a transfer process occurring during a predetermined period of time before the user instructed to correct the position of the tracking point (in the example shown in FIG. 24, the nth and (n−1)th transfer processes). Subsequently, the processing proceeds to step S155. In step S155, as described above, if a sufficient number of sample points have been accumulated, a new reference line is estimated, and the current reference line is replaced with the estimated reference line. In this way, the reference line changing process is performed.

As described above, in the reference line changing process, a reference line used for determination of adoption of a motion vector is not fixed, but is changed in accordance with the accumulated sample points. Accordingly, the changed reference line is suitable for an image that the user views.

Consequently, an accurate motion vector can be obtained, and therefore, a highly accurate tracking process of an object can be provided.

Figure 28:
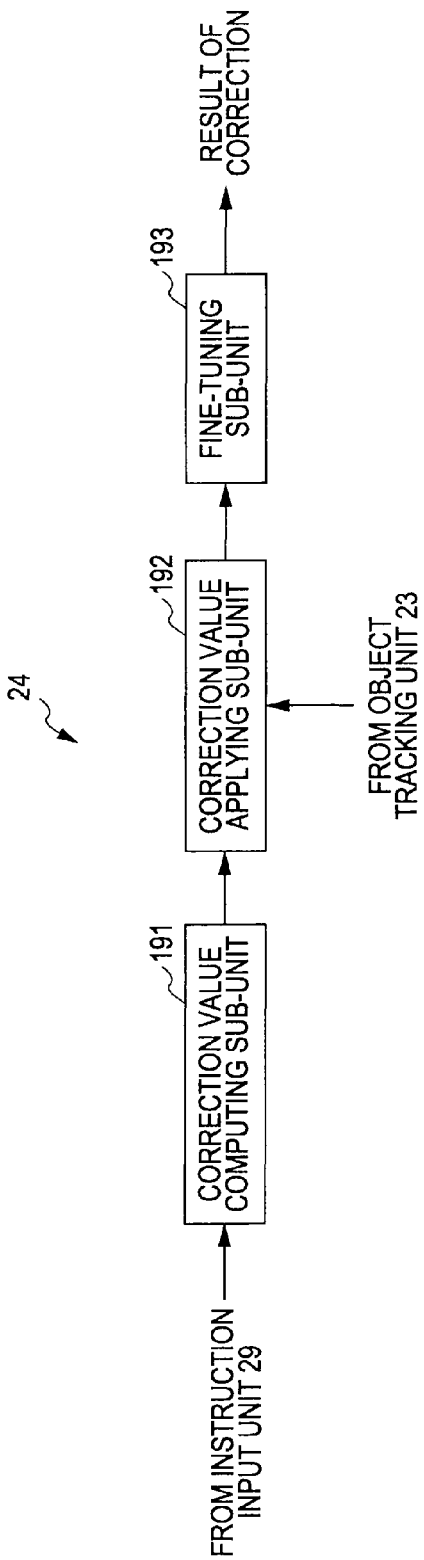
FIG. 28 is a block diagram illustrating an exemplary configuration of a tracking point correcting unit shown in FIG. 1.

An exemplary configuration of the tracking point correcting unit 24 shown in FIG. 1 is described in detail next with reference to FIG. 28. The tracking point correcting unit 24 includes a correction value computing sub-unit 191, a correction value applying sub-unit 192, and a fine-tuning sub-unit 193.

When the user instructs to correct the position of the tracking point through the instruction input unit 29, the correction value computing sub-unit 191 computes a correction value for the correction. For example, the instruction input unit 29 includes a four-way button that allows the user to select the upward direction, the downward direction, the right direction, and the left direction, and one push of the button provides a predetermined correction value. Accordingly, a correction value Δu is computed in accordance with the number of pushes performed by the user. Alternatively, the instruction input unit 29 may include a lever that allows the user to select a desired direction. In this case, a correction value Δu is computed in accordance with the tilt angle of the lever. The computed correction value Δu is output to the correction value applying sub-unit 192.

The correction value applying sub-unit 192 applies the correction value Δu supplied from the correction value computing sub-unit 191 to the position information serving as a tracking result supplied from the object tracking unit 23. The fine-tuning sub-unit 193 fine-tunes the tracking point to which the correction value applying sub-unit 192 has applied the correction value Δu received from the user.

Figure 29:
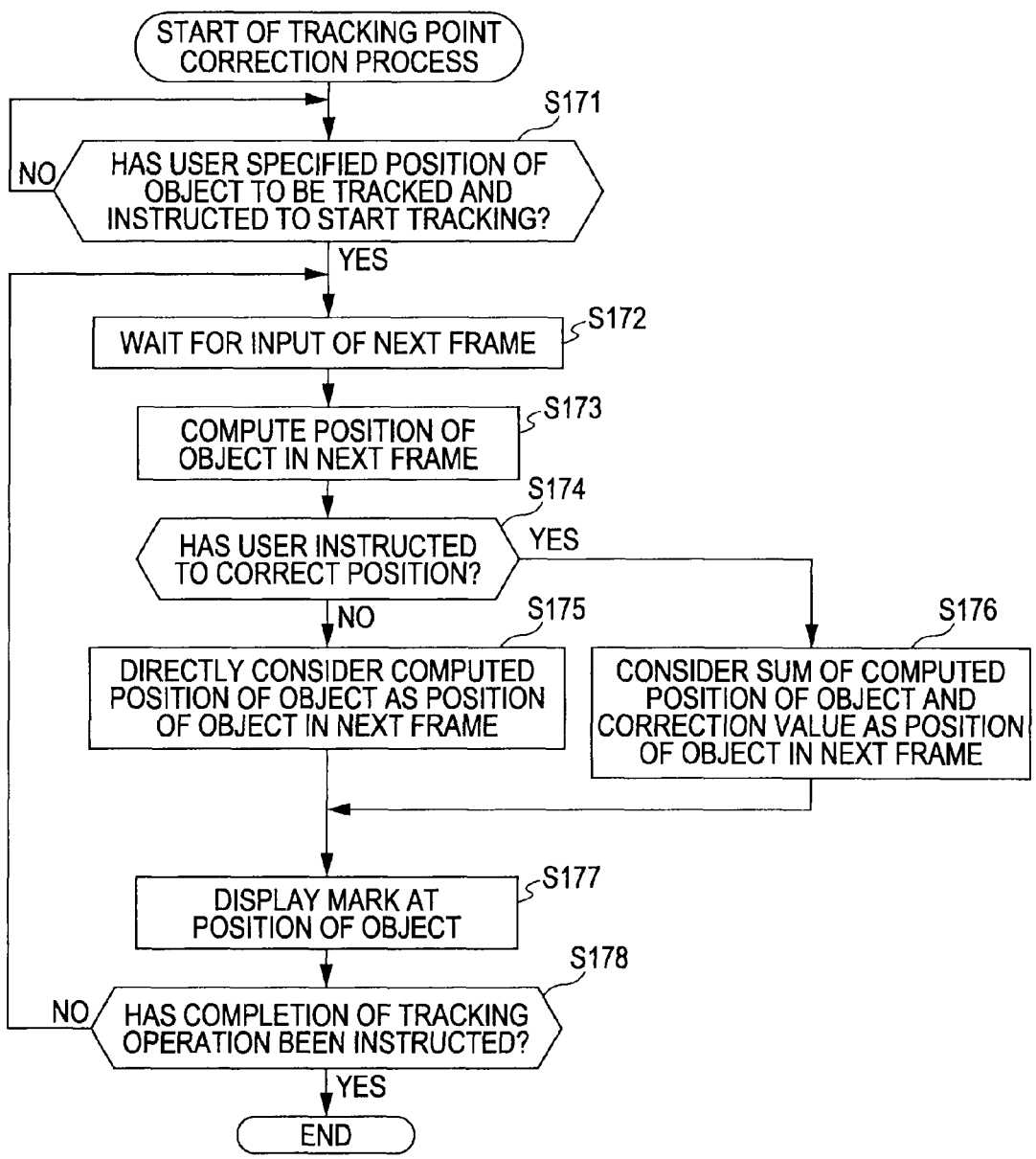
FIG. 29 is a flowchart illustrating an exemplary tracking point correction process.

An exemplary tracking point correction process performed by the tracking point correcting unit 24 is described next with reference to the flowchart shown in FIG. 29.

In step S171, the control unit 27 determines whether the user has used the instruction input unit 29 so as to specify the position of an object to be tracked and instruct to start tracking. If the instruction has not been received, the control unit 27 waits until it receives an instruction to start tracking. If, in step S171, the control unit 27 determines that the user has specified the position of an object to be tracked and has instructed to start tracking, the processing proceeds to step S172.

In step S172, the control sub-unit 60 of the object tracking unit 23 controls the other sub-units so that the sub-units wait for input of an image of the next frame. In step S173, the tracking point determining unit 57 computes the position of the object in the next frame.

In step S174, the control unit 27 determines whether the user has instructed to correct the position through the instruction input unit 29. If it is determined that the user has not instructed to correct the position, the processing proceeds to step S175, where the tracking point determining unit 57 directly considers the position of the object computed in step S173 as the position of the object in the next frame.

However, if, in step S174, it is determined that the user has instructed to correct the position, the processing proceeds to step S176, where the control sub-unit 60 outputs the tracking result received from the tracking point determining unit 57 to the tracking point correcting unit 24. The tracking point correcting unit 24 applies the correction value Δu specified by the user to the input tracking result. The application result is considered to be the position of the object in the next frame.

More specifically, the correction value computing sub-unit 191 computes a correction value in accordance with the operation amount of the instruction input unit 29 (e.g., the number of pushes of the button or the tilt angle of the lever).

Subsequently, the correction value applying sub-unit 192 applies the correction value specified by the user to the tracking result. Furthermore, the fine-tuning sub-unit 193 fine-tunes so that the tracking point is set to the center of the object to be tracked.

In step S177, the control unit 27 instructs the image display 25 to display, for example, a mark indicating the tracking point on the image captured by the image pickup unit 21 on the basis of the tracking result obtained in step S175 or S176.

In step S178, the control unit 27 determines whether the user has operated the instruction input unit 29 so as to instruct to complete the tracking. If it is determined that the user has not instructed to complete the tracking, the processing returns to step S172. Thereafter, the processing subsequent to step S172 is repeated. However, if, in step S178, it is determined that the user has instructed to complete the tracking, the tracking point correction process is completed.

As described above, in the tracking point correction process, the user can perform the correction. In addition, the tracking point is fine-tuned so that the tracking point is the same as the center of gravity of the object to be tracked. Accordingly, the robustness with respect to disturbance can be improved.

While the present embodiment of the present invention has been described with reference to a security camera system, the present embodiment is applicable to a variety of image signal processing apparatuses. For example, the present embodiment is applicable to a television receiver.

In addition, while the present embodiment of the present invention has been described with reference to frame-by-frame image processing, the present embodiment is applicable to field-by-field image processing.

The above-described series of processes can be realized not only by hardware but also by software. When the above-described series of processes are executed by software, the programs of the software are installed, from a program recording medium, in a computer incorporated in dedicated hardware or a computer that can execute a variety of function by installing a variety of programs therein (e.g., a general-purpose personal computer).

The program recording medium stores the programs that are to be installed in a computer and that are executable by the computer. As shown in FIG. 1, examples of the program recording medium include a magnetic disk (including a flexible disk), an optical disk (including a compact disc-read only memory (CD-ROM) and a digital versatile disc (DVD)), the removable medium 28 which is a package medium composed of a semiconductor memory, and a hard disk that temporarily or permanently stores a program. The programs may be stored in the program recording medium by using a wired or wireless communication medium, such as a local area network, the Internet, or a digital satellite broadcast, via an interface, such as a router or a modem.

The steps that describe the program stored in the recording medium include not only processes executed in the above-described sequence, but also processes that may be executed in parallel or independently.

In addition, as used herein, the term "system" refers to an entire apparatus including a plurality of sub-apparatuses.

The present application contains subject matter related to that disclosed in Japanese Priority Patent Application JP 2008-096990 filed in the Japanese Patent Office on Apr. 3, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image signal processing apparatus comprising:
  detecting means for detecting a motion vector of a tracking point provided on an object in a moving image;
  computing means for computing a reliability parameter representing the reliability of the detected motion vector;
  determining means for determining whether the detected motion vector is adopted by comparing the computed reliability parameter with a boundary dividing a first region and a second region, the computed reliability parameter falling in the first region indicating that the detected motion vector is not adopted, the computed reliability parameter falling in the second region indicating that the detected motion vector is adopted;
  accumulating means for accumulating the computed reliability parameter; and
  changing means for changing the boundary on the basis of the accumulated reliability parameter.

2. The image signal processing apparatus according to claim 1, wherein, when a transfer process of the tracking point occurs and a difference between a motion vector corresponding to an original tracking point before transfer and a motion vector corresponding to a new tracking point after transfer stays within a predetermined range, the accumulating means accumulates the reliability parameter representing the reliability of the motion vector corresponding to the original tracking point.

3. The image signal processing apparatus according to claim 2, wherein the changing means changes the boundary on the basis of the accumulated reliability parameter in response to a user operation to instruct correction of the position of the tracking point.

4. The image signal processing apparatus according to claim 3, wherein, in response to the user operation to instruct correction of a position of the tracking point, the accumulating means excludes, from the accumulated reliability parameters, the reliability parameters accumulated during a predetermined period of time before the user operation was performed, and wherein, after the reliability parameters accumulated during the predetermined period of time before the user operation was performed are excluded, the changing means changes the boundary on the basis of the accumulated reliability parameters.

5. The image signal processing apparatus according to claim 2, wherein, when a predetermined number of the reliability parameters are accumulated, the changing means changes the boundary on the basis of the accumulated reliability parameters.

6. The image signal processing apparatus according to claim 2, wherein the computing means computes an evaluation value representing a similarity between two images in a predetermined region including the tracking point and a block activity representing variation in pixels in the predetermined region including the tracking point, where a pair of the evaluation value and the block activity serves as the reliability parameter indicating the reliability of the detected motion vector, and wherein the accumulating means accumulates the pair of the computed evaluation value and block activity as the reliability parameter.

7. The image signal processing apparatus according to claim 6, wherein, when accumulating reliability parameters having the same block activity, the accumulating means accumulates only the reliability parameter having the larger evaluation value.

8. A method for processing an image signal, comprising the steps of:
  detecting a motion vector of a tracking point provided on an object in a moving image;
  computing a reliability parameter representing the reliability of the detected motion vector;
  determining whether the detected motion vector is adopted by comparing the computed reliability parameter with a boundary dividing a first region and a second region, the computed reliability parameter falling in the first region indicating that the detected motion vector is not adopted, the computed reliability parameter falling in the second region indicating that the detected motion vector is adopted;
  accumulating the computed reliability parameter; and
  changing the boundary on the basis of the accumulated reliability parameter.

9. A non-transitory computer-readable storage medium having instructions stored therein, which when executed by a processor in an image signal apparatus causes the processor to execute a method comprising:
  detecting a motion vector of a tracking point provided on an object in a moving image;
  computing a reliability parameter representing the reliability of the detected motion vector;
  determining whether the detected motion vector is adopted by comparing the computed reliability parameter with a boundary dividing a first region and a second region, the computed reliability parameter falling in the first region indicating that the detected motion vector is not adopted, the computed reliability parameter falling in the second region indicating that the detected motion vector is adopted;
  accumulating the computed reliability parameter; and
  changing the boundary on the basis of the accumulated reliability parameter.

10. An image signal processing apparatus comprising:
  a detecting unit configured to detect a motion vector of a tracking point provided on an object in a moving image;
  a computing unit configured to compute a reliability parameter representing the reliability of the detected motion vector;
  a determining unit configured to determine whether the detected motion vector is adopted by comparing the computed reliability parameter with a boundary dividing a first region and a second region, the computed reliability parameter falling in the first region indicating that the detected motion vector is not adopted, the computed reliability parameter falling in the second region indicating that the detected motion vector is adopted;
  an accumulating unit configured to accumulate the computed reliability parameter; and
  a changing unit configured to change the boundary on the basis of the accumulated reliability parameter.

* * * * *